United States Patent
Eliason et al.

(10) Patent No.: US 11,828,682 B2
(45) Date of Patent: Nov. 28, 2023

(54) INTEGRATED ILLUMINATION-DETECTION FLOW CELL FOR LIQUID CHROMATOGRAPHY

(71) Applicant: Phoseon Technology, Inc., Hillsboro, OR (US)

(72) Inventors: Garth Eliason, Hood River, OR (US); Patrick Kain, Portland, OR (US); John Christopher Freitag, Lake Oswego, OR (US); Doug Childers, Portland, OR (US); Jay Pasquantonio, Damascus, OR (US)

(73) Assignee: Phoseon Technology, Inc., Hillsboro, OR (US)

( * ) Notice: Subject to any disclaimer, the term of this patent is extended or adjusted under 35 U.S.C. 154(b) by 0 days.

(21) Appl. No.: 17/451,092

(22) Filed: Oct. 15, 2021

(65) Prior Publication Data
US 2022/0034855 A1 Feb. 3, 2022

Related U.S. Application Data

(62) Division of application No. 15/902,924, filed on Feb. 22, 2018, now Pat. No. 11,169,126.
(Continued)

(51) Int. Cl.
*G01N 30/74* (2006.01)
*G01N 21/59* (2006.01)
(Continued)

(52) U.S. Cl.
CPC ............ *G01N 30/74* (2013.01); *G01N 21/05* (2013.01); *G01N 21/255* (2013.01); *G01N 21/31* (2013.01);
(Continued)

(58) Field of Classification Search
CPC ...... G01N 30/74; G01N 21/05; G01N 21/255; G01N 21/31; G01N 21/59; G01N 2030/027; G01N 2201/0627
See application file for complete search history.

(56) References Cited

U.S. PATENT DOCUMENTS

| | | | |
|---|---|---|---|
| 3,499,716 | A | 3/1970 | Bennett |
| 4,040,750 | A | 8/1977 | Zwiener |

(Continued)

FOREIGN PATENT DOCUMENTS

| | | |
|---|---|---|
| CN | 1155655 A | 7/1997 |
| CN | 104736989 A | 6/2015 |

(Continued)

OTHER PUBLICATIONS

Kraiczek, K. et al., "Highly Flexible UV-Vis Radiation Sources and Novel Detection Schemes for Spectrophotometric HPLC Detection," Analytical Chemistry, vol. 86, No. 2, Dec. 30, 2013, 7 pages.
(Continued)

*Primary Examiner* — Dominic J Bologna
*Assistant Examiner* — Jarreas Underwood
(74) *Attorney, Agent, or Firm* — Wolf, Greenfield & Sacks, P.C.

(57) ABSTRACT

A liquid chromatography flow cell including an integrated light source and an integrated detection chamber. The integrated light source includes a plurality of light emitting diodes (LEDs), wherein each LED emits light of a specific wavelength. The light emitted from the integrated light source is directed to pass through a sample in a flow chamber of the flow cell without any optical conditioning, and the light not absorbed by the sample flows out of the flow chamber directly into the integrated detection chamber, where an intensity of the unabsorbed light is measured by detectors coupled to the integrated chamber.

16 Claims, 14 Drawing Sheets

Related U.S. Application Data

(60) Provisional application No. 62/462,786, filed on Feb. 23, 2017.

(51) Int. Cl.
  *G01N 21/05* (2006.01)
  *G01N 21/25* (2006.01)
  *G01N 21/31* (2006.01)
  *G01N 30/02* (2006.01)

(52) U.S. Cl.
  CPC ....... *G01N 21/59* (2013.01); *G01N 2030/027* (2013.01); *G01N 2201/0627* (2013.01)

(56) References Cited

U.S. PATENT DOCUMENTS

| | | | |
|---|---|---|---|
| 4,186,838 A | 2/1980 | Levitt et al. | |
| 4,278,887 A | 7/1981 | Lipshutz et al. | |
| 4,374,620 A | 2/1983 | Berick et al. | |
| 4,508,449 A | 4/1985 | Okazaki | |
| 4,815,843 A | 3/1989 | Tiefenthaler et al. | |
| 5,073,345 A | 12/1991 | Scott et al. | |
| 5,353,790 A * | 10/1994 | Jacques | G01N 21/4738 600/315 |
| 5,408,326 A * | 4/1995 | Wang | G01N 30/74 250/576 |
| 5,444,807 A * | 8/1995 | Liu | G02B 6/032 204/603 |
| 5,818,578 A * | 10/1998 | Inman | G01N 21/15 356/440 |
| 5,963,336 A * | 10/1999 | McAndrew | G01N 21/39 216/60 |
| 6,064,488 A * | 5/2000 | Brand | G01N 21/8507 356/440 |
| 6,331,704 B1 | 12/2001 | Owen | |
| 6,542,231 B1 * | 4/2003 | Garrett | G02B 6/032 385/12 |
| 7,122,800 B2 | 10/2006 | Barry et al. | |
| 7,808,641 B2 | 10/2010 | Salerno et al. | |
| 8,730,479 B2 * | 5/2014 | Ness | G01N 15/1456 356/441 |
| 9,322,772 B2 * | 4/2016 | Ehring | G01N 30/74 |
| 11,169,126 B2 | 11/2021 | Eliason et al. | |
| 2002/0195554 A1 | 12/2002 | Staton et al. | |
| 2003/0169420 A1 * | 9/2003 | Ruiz | G01J 3/28 356/307 |
| 2006/0250606 A1 | 11/2006 | Kaye et al. | |
| 2006/0263263 A1 | 11/2006 | Shimizu | |
| 2009/0237003 A1 | 9/2009 | Sormani et al. | |
| 2011/0132077 A1 | 6/2011 | Killeen et al. | |
| 2013/0105708 A1 * | 5/2013 | Bennett | G01N 21/6458 250/459.1 |
| 2014/0191117 A1 | 7/2014 | Bland et al. | |
| 2014/0287449 A1 * | 9/2014 | Bonyuet | C12Q 1/02 435/29 |
| 2015/0107993 A1 | 4/2015 | Izquierdo et al. | |
| 2015/0189714 A1 * | 7/2015 | Fathalla | H05B 45/12 315/134 |
| 2016/0231232 A1 * | 8/2016 | Bhargav | G01N 21/274 |
| 2016/0356695 A1 * | 12/2016 | Gabriel | G01N 33/5044 |
| 2016/0356696 A1 * | 12/2016 | Lewis | G01N 15/1436 |
| 2017/0030828 A1 * | 2/2017 | Harrison | G01N 21/15 |
| 2018/0187234 A1 * | 7/2018 | Kacira | C12Q 1/02 |
| 2018/0238845 A1 | 8/2018 | Eliason et al. | |

FOREIGN PATENT DOCUMENTS

| | | |
|---|---|---|
| CN | 104972079 A | 10/2015 |
| CN | 105556282 A | 5/2016 |
| CN | 205898667 U | 1/2017 |
| JP | 3036930 | 5/1997 |
| JP | 2009168478 A | 7/2009 |
| JP | 2011095181 A | 5/2011 |
| JP | 2015-215340 A | 12/2015 |
| WO | 2010015509 A1 | 2/2010 |
| WO | WO 2014/157282 A1 | 10/2014 |
| WO | 2016170681 A1 | 10/2016 |
| WO | WO 2016/170670 A1 | 10/2016 |
| WO | 2016194108 A1 | 12/2016 |

OTHER PUBLICATIONS

Sharma, S. et al., "LED-Based UV Absorption Detector with Low Detection Limits for Capillary Liquid Chromatography," Analytical Chemistry, vol. 87, No. 2, Jan. 2015, Available Online as Early as Dec. 24, 2014, 6 pages.

Ipson, N., "BYU researchers shrink device for detecting toxins in liquids, boost sensitivity," BYU News Website, Available Online at /news/byu-researchers-shrink-device-detecting-toxins-liquids-boost-sensitivity, Mar. 22, 2016, 6 pages.

ISA Korean Intellectual Property Office, International Search Report and Written Opinion Issued in Application No. PCT/US2018/019277, dated Jun. 8, 2018, WIPO, 13 pages.

European Patent Office, Extended European Search Report Issued in Application No. 18756839.9, dated Nov. 25, 2020, Germany, 10 pages.

International Search Report and Written Opinion for International Application No. PCT/US2018/019277 dated Jun. 8, 2018.

International Preliminary Report on Patentability for International Application No. PCT/US2018/019277 dated Sep. 6, 2019.

Partial European Search Report for European Application No. 18756839.9 dated Aug. 25, 2020.

Li et al., Solvatochromic studies of the surface polarity of silica under normal-phase conditions. Analytica chimica acta. Aug. 30, 1995;312(2):127-39.

* cited by examiner

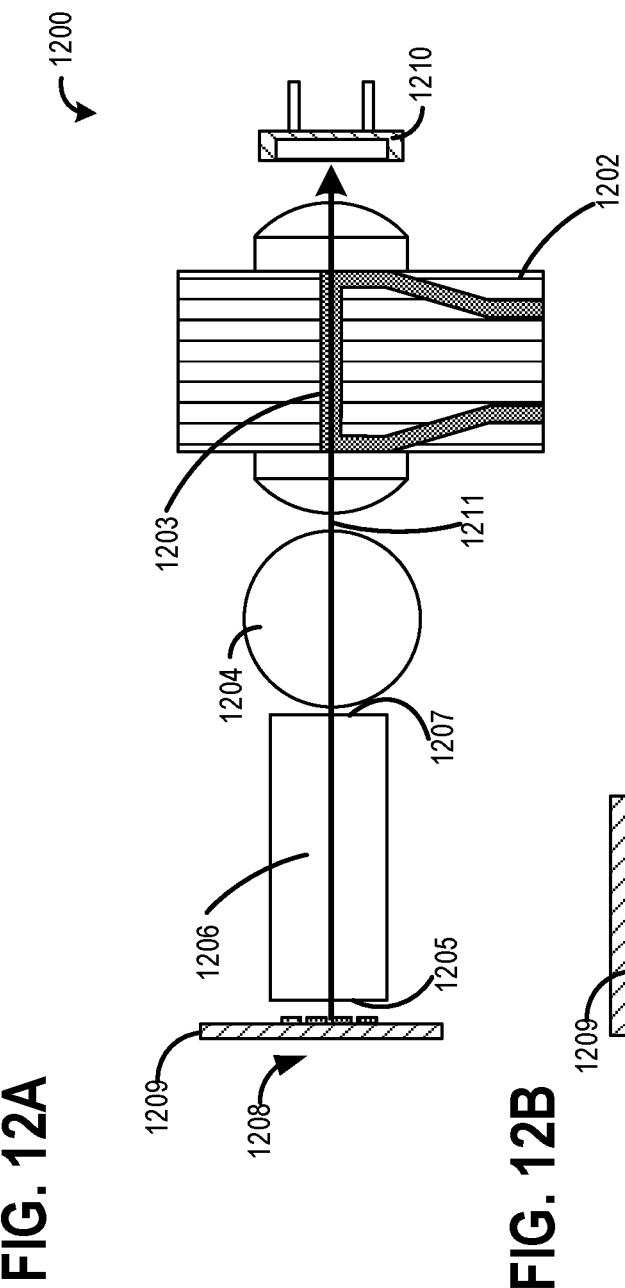
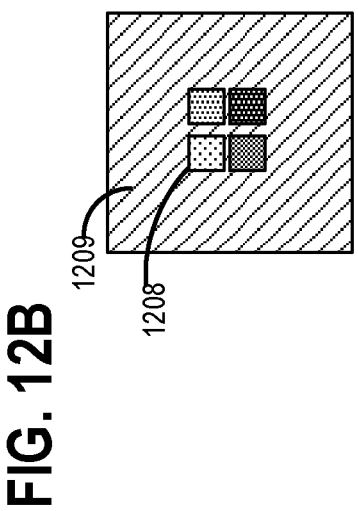
FIG. 12A
FIG. 12B

INTEGRATED ILLUMINATION-DETECTION FLOW CELL FOR LIQUID CHROMATOGRAPHY

CROSS-REFERENCE TO RELATED APPLICATIONS

The present application is a divisional of U.S. Non-Provisional patent application Ser. No. 15/902,924, entitled "INTEGRATED ILLUMINATION-DETECTION FLOW CELL FOR LIQUID CHROMATOGRAPHY", and filed on Feb. 22, 2018. U.S. Non-Provisional patent application Ser. No. 15/902,924 claims priority to U.S. Provisional Application No. 62/462,786 entitled "INTEGRATED ILLUMINATION-DETECTION FLOW CELL FOR LIQUID CHROMATOGRAPHY", and filed on Feb. 23, 2017. The entire contents of which are hereby incorporated by reference for all purposes.

BACKGROUND AND SUMMARY

Conventional liquid chromatography systems; such as high-performance liquid chromatography (HPLC), two-dimensional HPLC, and ultra-high performance liquid chromatography (UHPLC), operate on the principle of exposing a sample to a particular wavelength of light to determine physical properties of the sample. Light emitted from a light source is optically transmitted through a flow cell of the liquid chromatography system. The light transmitted through the flow cell may be partially to fully absorbed by the sample inside the flow cell. Any unabsorbed light may scatter through the sample and is transmitted to a detection system (for example, to a variable wavelength detector system or to a diode array detector system). Based on the detection profile, a constituent elemental or compound makeup of the sample is generated.

The light sources used for HPLC systems may include deuterium, mercury arc, and/or tungsten lamps, which are relatively large compared to a typical flow cell of the HPLC system. Additionally, the light emitted from these light sources is spatially and spectrally broad, thus requiring optical conditioning. Considerable heat is also generated by the above-mentioned light sources, which may lead to undesirable thermal effects on the sample inside the flow cell. The light sources also have to be pre-warmed before use and typically have a limited life (for example, a tungsten lamp is typically replaced after ~2000 hours of use), increasing both the time and the cost of operating the HPLC system.

One example approach to address the above-mentioned problems has been shown by Bland et al. in U.S. 2014/0191117 A1. Therein, a plurality of light emitting diodes (LEDs) are used as a light source in a chromatography system, wherein each LED emits a light of a different wavelength. The LEDs do not require pre-warming before use and last longer than the light sources mentioned above.

However, the inventors herein recognize that in the above-mentioned approach, multiple optical elements, including spectral filters, alignment and focusing lenses, a broadband filter, a beam splitter, etc., may be present between the light source and the flow cell, which adds substantial optical pathlength, leading to a large form factor of the HPLC system. A detector of the HPLC system may be positioned to detect the light scattered after it flows through the sample in the flow cell, which may further increase the size of the HPLC system. The multiple optical elements may also contribute to additional noise generation, thereby diminishing the signal-to-noise ratio.

The inventors herein have recognized the above-mentioned issues in liquid chromatography systems and have engineered a way to at least partially address them. In one example approach, a detector system includes a flow cell including an optically transparent first wall and an optically transparent second wall, the optically transparent second wall positioned opposite the optically transparent first wall; a plurality of light sources integrated within the flow cell, the plurality of light sources configured to emit light to travel through the optically transparent first wall into the flow cell; and a detection chamber integrated with the flow cell and configured to capture light passing out from the flow cell through the optically transparent second wall into the detection chamber. In this way, a form factor of the detector system may be reduced while a signal-to-noise ratio is increased.

The plurality of light sources may be each controlled independently by a controller. In one example, each of the plurality of light sources is an LED. Each of the plurality of light sources may be configured to emit light of a specific wavelength that flows through the optically transparent first wall into the flow cell and from the flow cell through the optically transparent second wall into the detection chamber. Each of the plurality of light sources is adjacent to a reference diode integrated within the flow cell, wherein a signal from the reference diode is relayed to the controller, which in turn controls the output level of the light source. Furthermore, the detection chamber may include one or more photodetectors coupled thereto as well as a diffuse, reflective interior coating. The interior coating may enable wider dispersion light exiting the flow cell through the optically transparent second wall to be fully collected and measured by the one or more photodetectors. In this way, the signal-to-noise ratio of the detector system may be further increased while the form factor of the system is further decreased. Furthermore, the use of LEDs, which do not have to be pre-warmed and have a long lifespan, may enhance efficiency and reduce the cost of operating the detector system, which may be included in a liquid chromatography system.

The above advantages and other advantages and features of the present description will be readily apparent from the following detailed description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 12A and 12B illustrate schematics of a waveguide beam combining system that may be included in a liquid chromatography detector system.

DETAILED DESCRIPTION

Figure 1:
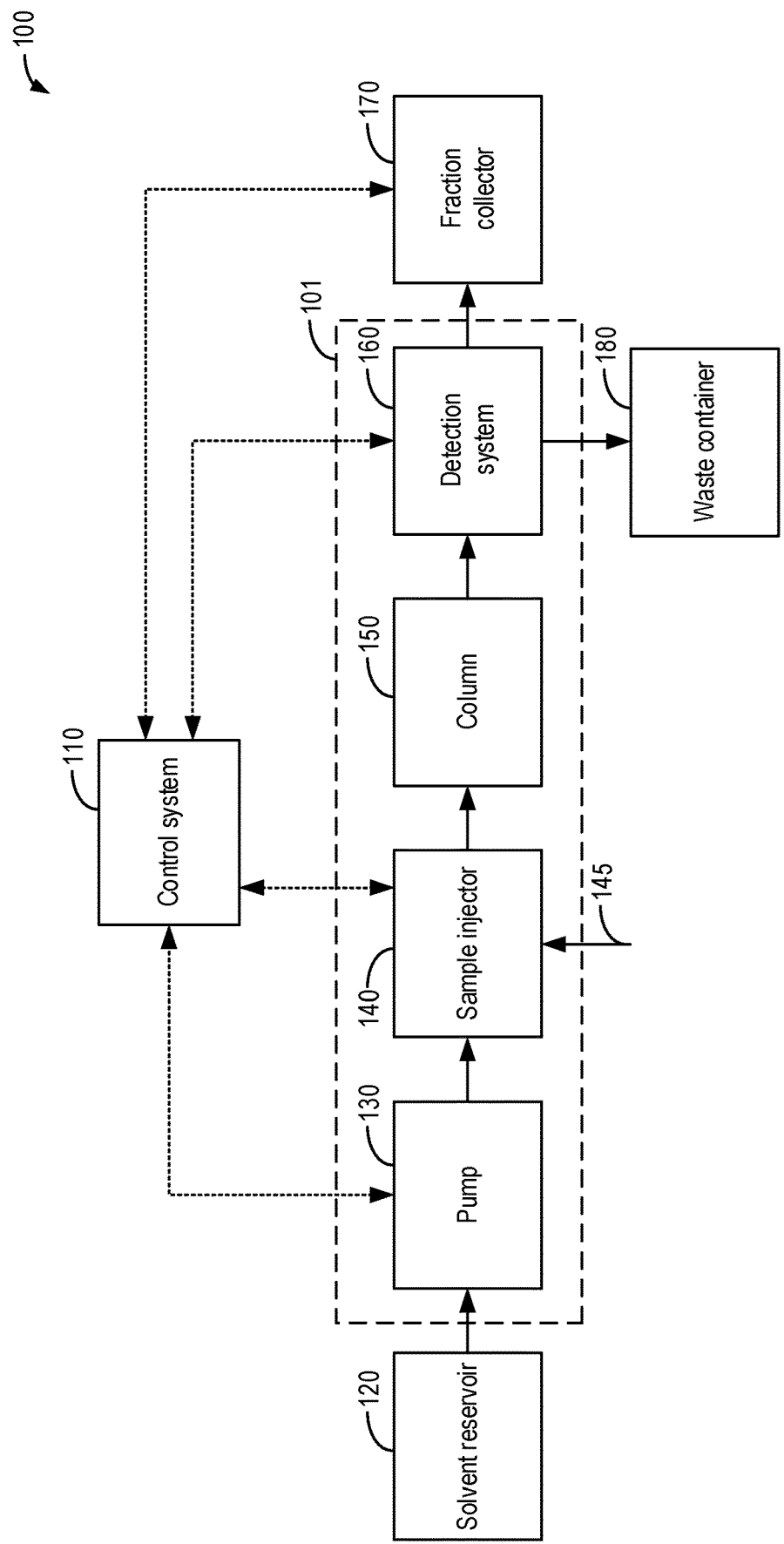
FIG. 1 shows a schematic depiction of a high-performance liquid chromatography (HPLC) system.
Figure 2:
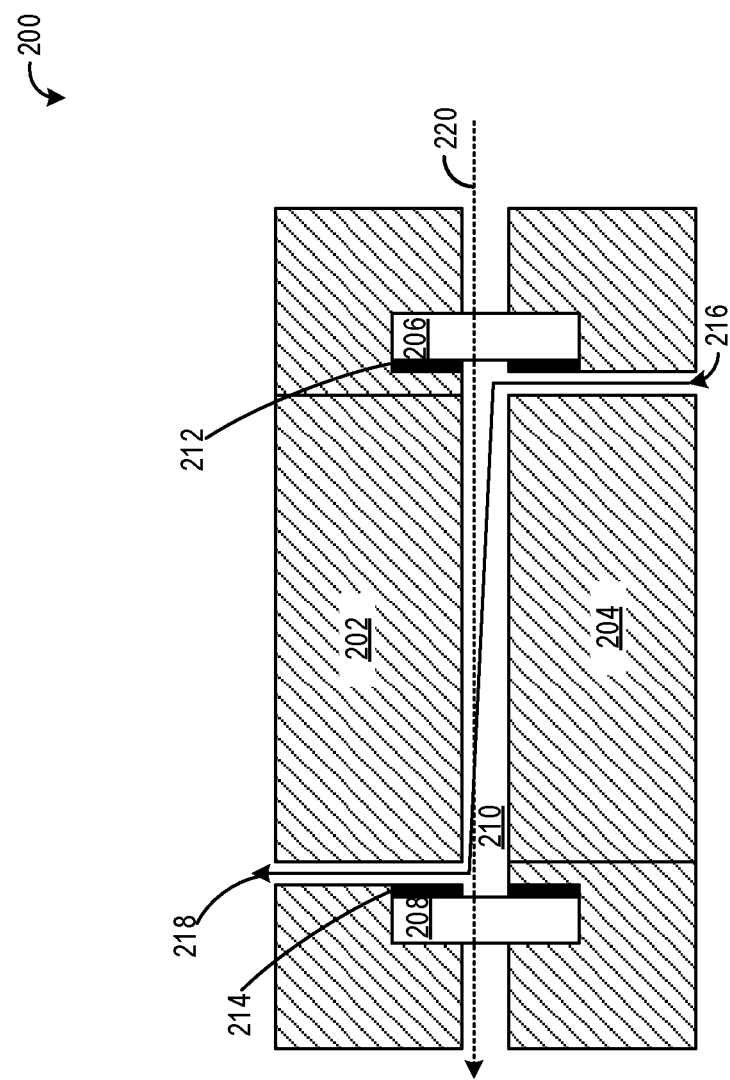
FIG. 2 shows a schematic depiction of a liquid chromatography flow cell.
Figure 3:
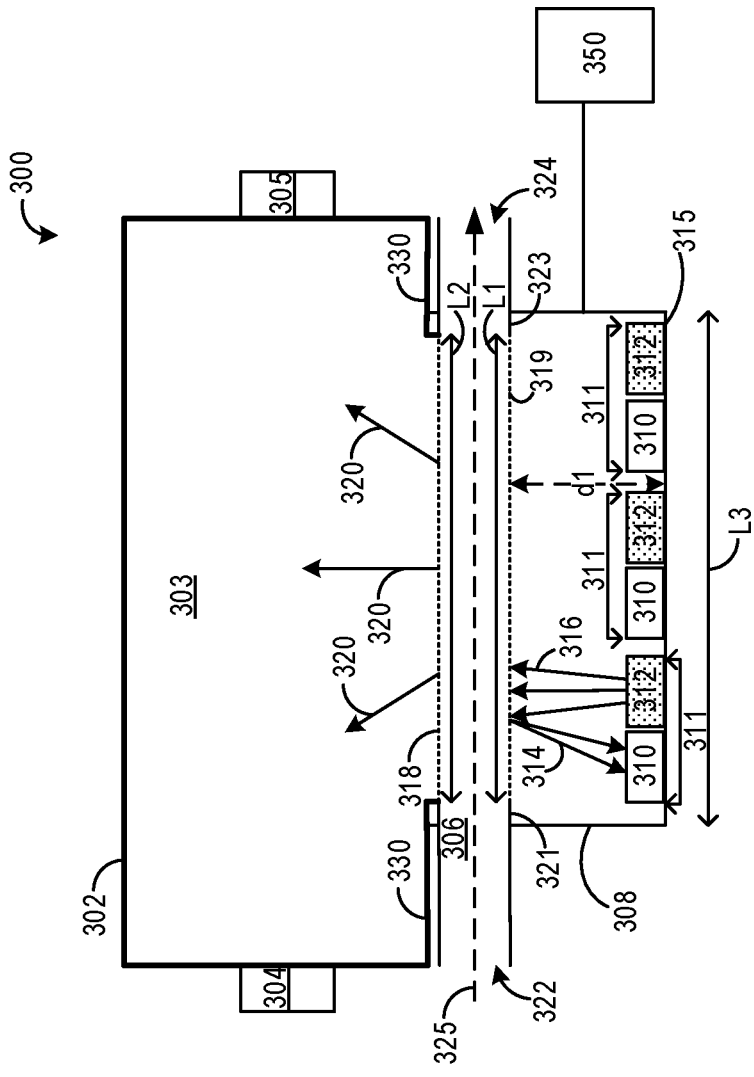
FIG. 3 illustrates a first embodiment of an integrated illumination-detection flow cell.
Figure 4:
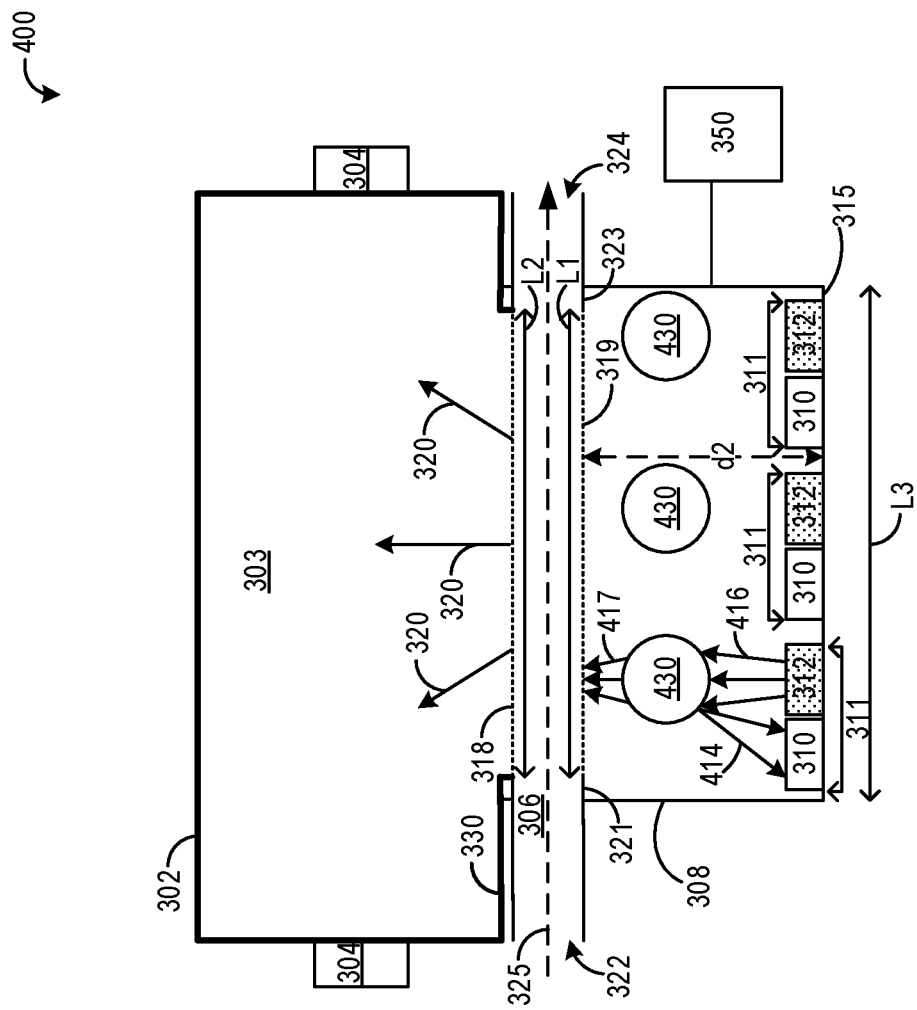
FIG. 4 illustrates a second embodiment of an integrated illumination-detection flow cell.
Figure 5:
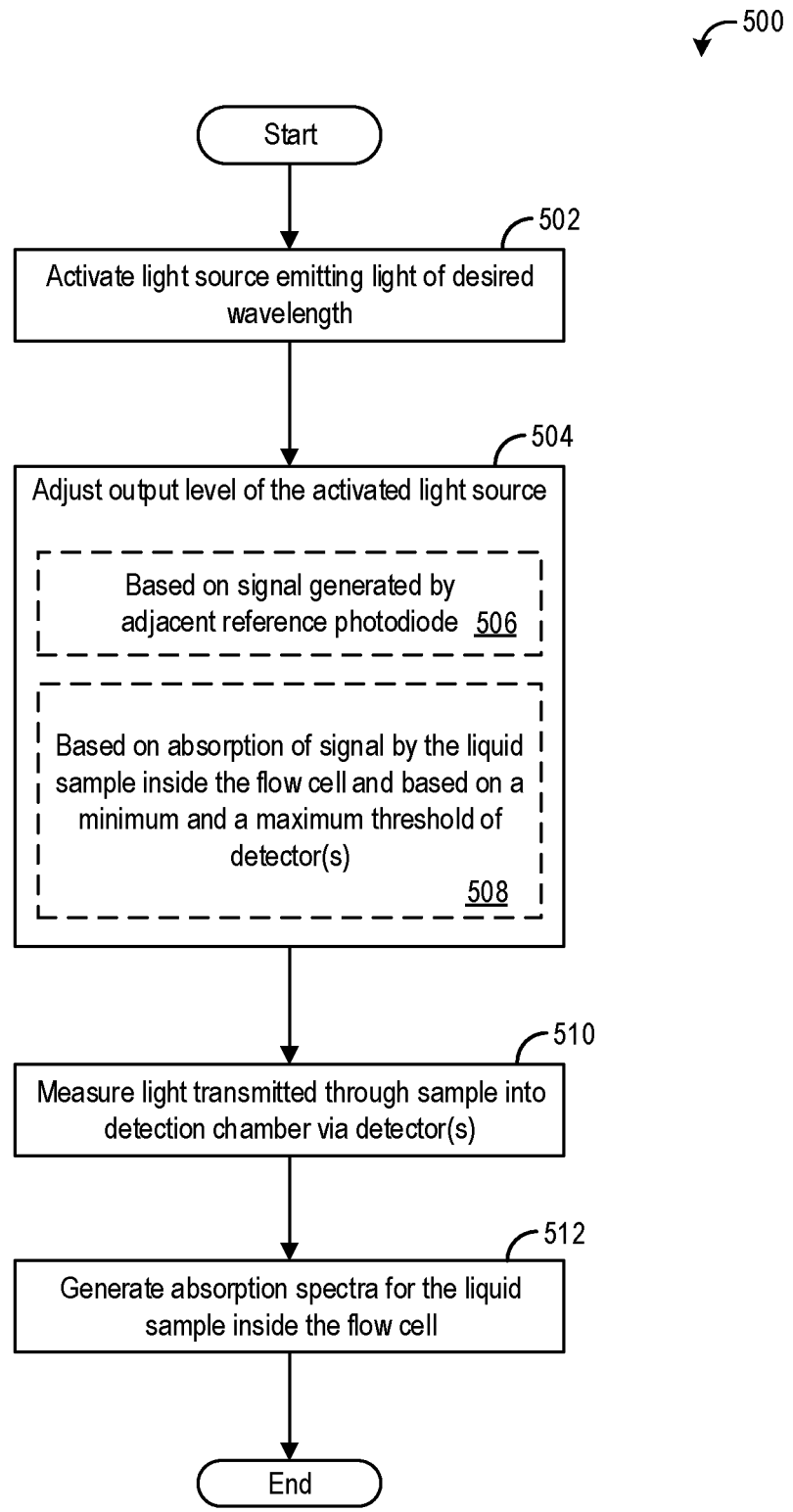
FIG. 5 illustrates a method for operating a liquid chromatography detector system including an integrated illumination-detection flow cell.
Figure 6:
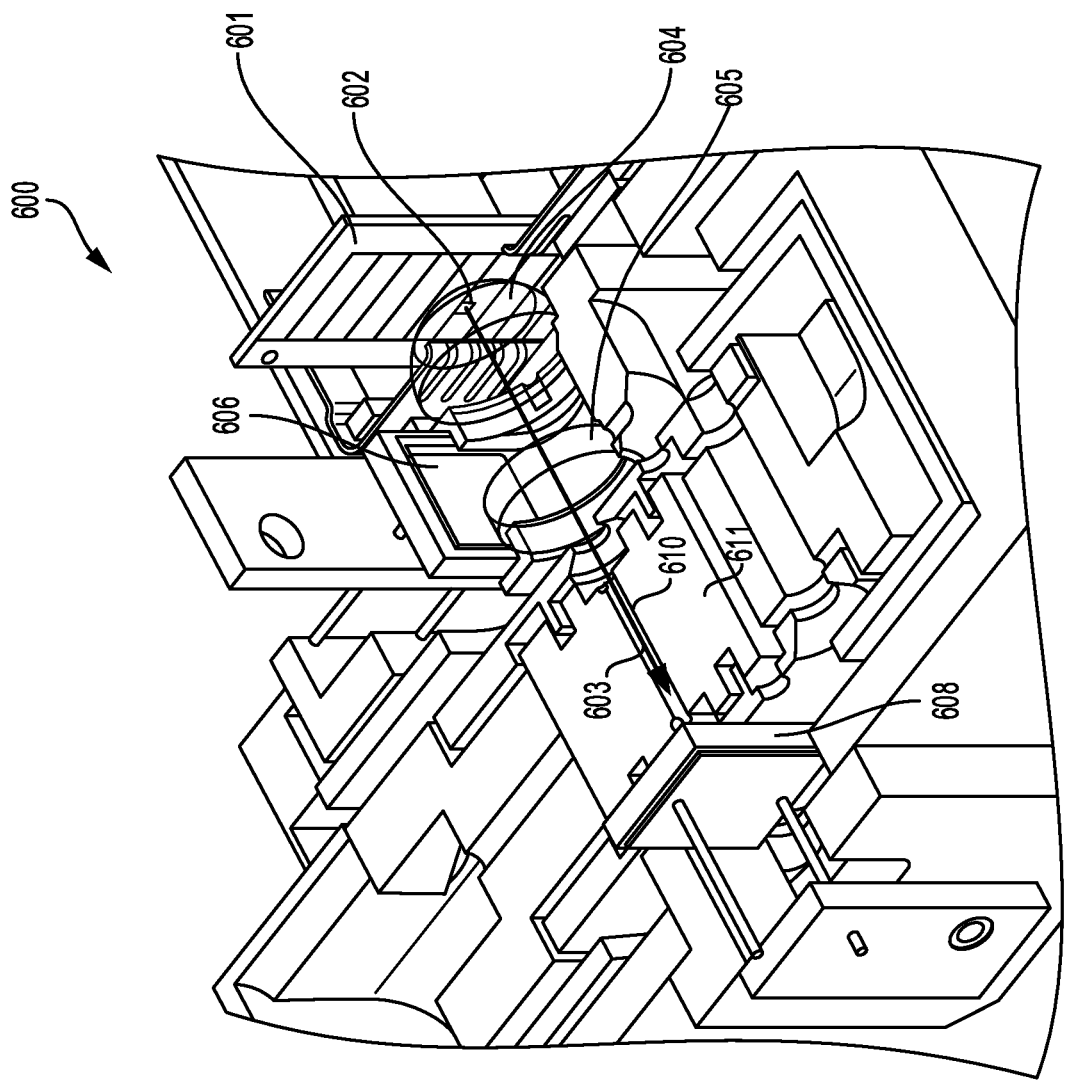
FIG. 6 illustrates an example of a liquid chromatography flow cell in which a light source and a sample detector is not integrated.

The present description is related to a detection system, which may be included in an HPLC system, such as the example HPLC system schematically shown in FIG. 1. FIG. 2 shows an example configuration of a flow cell that may be included in the detection system. The flow cell may contain a liquid sample. The liquid sample in the flow cell may absorb the light at least partially, and the remaining unabsorbed light may be directed to flow toward a detector, such as an ultraviolet (UV) and/or visible light (VIS) photodetector. FIGS. 3 and 4 illustrate a first embodiment and a second embodiment, respectively, of an integrated illumination-detection flow cell, in which the detectors and the light source are both integrated with the flow cell to decrease a number of optical elements between the light source and the liquid sample and the liquid sample and the detectors, which reduces the form factor of the HPLC system. A method for operating the integrated illumination-detection flow cells is illustrated in FIG. 5. FIG. 6 illustrates a HPLC flow cell with a single wavelength light source, which may be arranged according to the example configurations shown in FIGS. 7-9. FIGS. 10-16 show examples of multiple wavelength illumination systems that may be included in a detector system of an HPLC system.

Referring to FIG. 1, a schematic diagram of an example HPLC system 100 is shown. HPLC system 100 includes a control system 110, a solvent reservoir 120, a pump 130, a sample injector 140, a column 150, a detection system 160, a fraction collector 170, and a waste container 180. Multiple components of the HPLC system 100 may be included in a common housing 101. As shown in FIG. 1, the pump 130, sample injector 140, column 150, and detection system 160 are all housed within common housing 101. However, in other examples, more or fewer components could be housed in the common housing. For example, the solvent reservoir, fraction collector, and/or waste container may be housed in the common housing. Additionally or alternatively, the control system 110 may be housed in the common housing.

The control system 110 is communicatively coupled to other components of the HPLC system (as indicated by dashed lines), as described further below, in order to send and receive signals during system operation. Control system 110 may include a controller, such as a desktop or laptop computer, one or more user input devices (e.g., a mouse, keyboard, touch screen), a display system, and/or a communication system operable to couple the controller to one or more remote computing devices, for example. Control system 110 may receive input from an HPLC system operator to initiate a sample run. In other examples, the sample run may be automated or semi-automated, with control system 110 initiating the sample run according to one or more methods stored in a memory of the control system. The controller may be an electronic controller and may include a memory storing instructions executable to carry out one or more of the methods described herein. Furthermore, the controller may include one or more physical logic devices, such as one or more processors, configured to execute instructions. Additionally or alternatively, controller 12 may include hardware or firmware configured to carry out hardware or firmware instructions. The memory may include removable and/or built-in devices, including optical memory, semiconductor memory, and/or magnetic memory. The memory may include volatile, nonvolatile, dynamic, static, read/write, read-only, random-access, sequential-access, location-addressable, file-addressable, and/or content-addressable devices. The memory and logic device(s) may be integrated together into one or more hardware-logic components, such as field-programmable gate arrays (FPGAs).

Prior to sample injection, HPLC system 100 may be primed with solvent. Control system 110 may activate pump 130, which draws solvent from solvent reservoir 120 that is fluidically connected to pump 130 and other components of HPLC system 100 downstream of pump 130 by lines. Solvent reservoir 120 may hold one or more solvents, such as hexanes, ethyl acetate, dichlormethane, and methanol, with the solvent(s) pumped by pump 130 input into control system 110 by the HPLC system operator or automatically selected based on a pre-programmed method stored in the memory of control system 110. In one example, one solvent, such as hexanes, may be used to prime HPLC system 100. In another example, two solvents at a selected ratio, such as 4:1 hexanes:ethyl acetate or 9:1 dichloromethane:methanol, may be used. Other suitable solvents may be selected to suit the application chemistry, chromatography method, column type, etc. In still another example, three or more solvents may be used. The solvent(s) and ratio used may be selected (e.g., by the HPLC operator or control system 110) based on the components to be purified. Thus, as used herein, the term "solvent" also includes solvent mixtures. The term solvent refers to the mobile phase eluate exiting the column without analyte.

Solvent pumped by pump 130 flows through sample injector 140 and into column 150. Column 150 may contain a solid phase adsorbent, such as silica gel, alumina, or other functionalized medium, selected based on the components to be analyzed. The length and diameter of column 150 may also be selected based on the application chemistry or chromatography method and may be installed by the HPLC system operator prior to activating the pump. After flowing through the column, the solvent flows through detection system 160. Detection system 160 may include one or more light sources, a flow cell, and one or more photodetectors, as described further herein, although other types of detection systems may additionally or alternatively be used, such as photoionization detectors, charged aerosol detectors, electrical conductivity detectors, electrochemical detectors, mass spectrometers, refractive index detectors, etc. In the example of FIG. 1, detection system 160 is configured to measure UV and visible light transmission and absorbance. Detection system 160 may measure a baseline absorbance value of the solvent. Control system 110 may subsequently subtract this baseline absorbance value from values measured after sample injection. After flowing through detection system 160, the solvent is flowed to waste container 180.

Once HPLC system 100 is primed (e.g., the column is equilibrated with the appropriate solvent), a sample 145 may be injected via sample injector 140 into the flow path of solvent pumped by pump 130. In some examples, sample injector 140 may be an autosampler programmed to inject a sample according to a pre-determined method executed by control system 110. In another example, the HPLC operator may manually operate sample injector 140.

Once sample 145 is injected, it is loaded (e.g., adsorbed) onto the resin of column 150. Different components of sample 145 may have different affinities for the resin as well as the solvent flowing through column 150. Thus, components with higher affinities for the resin will move through the column more slowly, while components with higher affinities for the solvent will move through the column more quickly. For example, if the resin is silica gel and the solvent has a low polarity (such as hexanes or a solvent mixture with a high ratio of hexanes), a more polar component will have stronger interactions with the silica gel and will be retained on the column for a longer duration, and a more nonpolar component will have stronger interactions with the solvent and will be eluted from the column after a shorter duration. Further, the solvent(s) used may be adjusted throughout the sample run, such as by increasing the polarity of the solvent mixture, in what is known as a gradient elution. In other examples, the composition of the solvent may remain constant throughout the sample run in what is known as isocratic elution. Other elution methods may also be used, such stepwise elution or combination elution methods.

After each component of sample 145 is eluted from column 150, it passes through detection system 160. Detection system 160 exposes the component to one or more wavelengths of light, as described further herein. As light from a light source of detection system 160 passes through the component, which is diluted in the solvent, some or all of the light may be absorbed, with the amount of light transmitted through the component measured by a detector of detection system 160. Control system 110 may generate an absorbance profile of the component from data received from detection system 160. From detection system 160, each component may flow to fraction collector 170. Fraction collector 170 may fill collection containers, such as vials or test tubes, with eluted components. The containers may be filled to a set volume, with the fraction collector advancing to the next container when the set volume is reached. In another example, the fraction collector may advance to the next container based on the absorbance profile of the component that has passed through the detector. If the absorbance profile changes, control system 110 may trigger fraction collector 170 to advance to the next container, as a change in absorbance profile may indicate a different component. Thus, two components may be kept separate. Filled containers may be referred to as fractions.

Control system 110 may generate a chromatogram with absorbance (as measured by detection system 160) as the Y-axis plotted against retention time (the time it takes a component to pass through HPLC system 100) and/or fraction number as the X-axis. The chromatogram may contain distinct peaks in absorbance corresponding to each analyte (e.g., component) that has passed through the system. Optimally, the absorbance signal is proportional to the concentration of analyte, and the peaks for each analyte are separated. The HPLC system operator may identify fractions containing a component of interest based on the chromatogram and/or absorbance profiles. Therefore, the ability to identify fractions containing the component of interest may depend on the accuracy and sensitivity of detection system 160.

Referring now to FIG. 2, a schematic shows a flow cell 200, which may be included in a detection system of a liquid chromatography system (for example, in detector system 160 of HPLC system 100 of FIG. 1). The flow cell 200 may include a chamber 210 defined by a first section 202 and a second section 204, opposite the first section 202 of the flow cell 200. In addition, a first optically transparent window 206 and a second optically transparent window 208, opposite the first optically transparent window 206, may define the chamber 210. In other examples, when flow cell 200 is a sample cell, the chamber 210 may be a cuvette where the first optically transparent window 206 may be a first optically transparent wall of the cuvette and the second optically transparent window 208 may be a second optically transparent wall of the cuvette.

A liquid sample (e.g., sample 145 of FIG. 1) may enter the chamber 210 along an entry path 216. In one example, the entry path 216 may pass through the second section 204 of the flow cell and may open into the chamber 210, delivering a liquid sample into the chamber. The liquid sample may flow into the chamber 210 and flow out of the chamber through an exit path 218. In one example, the exit path 218 may pass through the first section 202 of the flow cell 200, as shown. In another example, the exit path 218 may pass through the second section 204 of the flow cell 200. A first gasket 212 along the first optically transparent window 206 and a second gasket 214 along the second optically transparent window 208 may prevent the liquid sample from leaking from the chamber 210.

Light may enter the chamber 210 through the first optically transparent window 206 and travel through the chamber 210, containing the liquid sample, as indicated by a dashed arrow 220. The light entering the chamber originates from a light source (not shown). In one example, the light source may be a plurality of LEDs, each LED of the plurality of LEDs emitting a light of a different wavelength (for example, 254 nm, 280 nm, 395 nm, 525 nm, etc.). Light sources and their configuration within the detector unit will be described below with reference to FIGS. 3-4 and 7-16.

As light travels through the chamber 210 and the liquid sample therein, the liquid sample (e.g., comprising one or more analytes and one or more solvents) may at least partially absorb the light. Light absorption by the liquid sample depends on constituents present in the sample. The light that is not absorbed by the liquid sample exits the chamber 210 through the second optically transparent window 208. The unabsorbed light exiting the second optically transparent window may then be directed to a sample detector (not shown). The sample detector may be a variable wavelength detector or a diode array detector, for example.

Thus, FIG. 2 shows a flow cell that is separate from a light source and a sample detector. Furthermore, multiple optical elements, such as lenses, mirrors, filters, slits, and beam splitters, may be present between the light source and the flow cell and/or the flow cell and the sample detector. As a result, the optical pathlength may be increased, increasing a form factor of a corresponding detector system and HPLC system. Furthermore, a signal-to-noise ratio of a light signal received by the sample detector may be decreased. Therefore, systems that minimize the optical pathlength and/or increase an amount of light captured by the sample detector may decrease a form factor of the corresponding detector system and HPLC system as well as increase the signal-to-noise ratio at the sample detector.

FIG. 3 illustrates a first embodiment of an integrated illumination-detection flow cell 300. As an example, the integrated illumination-detection flow cell 300 may be included in a detection system of an HPLC system, such as detection system 160 of HPLC system 100 shown in FIG. 1. The integrated illumination-detection flow cell 300 may include a flow cell 308 with a flow channel 306, similar to the flow cell 200 illustrated in FIG. 2. The flow channel 306 may include an inlet 322 and an outlet 324, wherein a liquid sample may flow in through the inlet 322 along a path indicated by a dashed arrow 325 through the flow channel 306 and exit through the outlet 324. A flow rate of the liquid sample through the flow channel 306 may be regulated by a flow regulator (not shown) upstream of the inlet 322. The flow channel 306 may be at least partially inside the flow cell 308.

The flow cell 308 may include a plurality of diode pairs 311, each of the diode pairs 311 including a light source 312 and a photodiode 310 adjacent to the light source 312. The plurality of diode pairs 311 are integrated with the flow cell 308, such as positioned within an interior of a housing of the flow cell 308. In one example, the plurality of diode pairs 311 may be coupled to a bottom surface 315 of the flow cell 308, wherein the bottom surface 315 of the flow cell is parallel to the flow channel 306, as illustrated in FIG. 3. Each light source 312 may be a light-emitting diode (LED), wherein each LED in the plurality of diode pairs 311 emits light of a different wavelength (for example, 254 nm, 280 nm, 395 nm, 525 nm, etc.). The LEDs do not have to be pre-warmed and are longer lasting than other light sources, such as a tungsten lamp, a mercury arc lamp, and/or a deuterium lamp. Each LED may be selected and controlled independently to emit light of desired wavelength, for example, by a controller 350 coupled to the integrated illumination-detection flow cell 300. The controller 350 may be included in control system 114 of HPLC system 100 shown in FIG. 1, for example. The LEDs may receive power from a power source coupled to the LEDs (not shown). In another example, each light source 312 may be a laser diode, with each laser diode 312 emitting light of a different wavelength. In still other examples, the light source 312 may comprise a LED in one or more of the plurality of diode pairs 311, while the light source 312 may comprise a laser diode in a remaining number of the plurality of diode pairs 311.

The photodiode 310 adjacent to the light source 312 of each diode pair 311 may be a photodetector, for example. Each photodiode 310 may serve as a reference detector for the corresponding light source 312 of the diode pair 311, and each of the plurality of diode pairs 311 may be coupled to the controller 350. The controller 350 may control an output level/intensity of light emitted by the light source 312 of the diode pair 311 based on an intensity of a signal received from the photodiode 310 paired with the activated light source 312, as will be discussed in detail with reference to FIG. 5. For example, as an amount of light measured by the photodiode 310 increases, a voltage output by the photodiode 310 may increase.

Light emitted from each light source 312 may travel directly toward the flow channel 306 along a plurality of light paths 316. The light emitted from each light source 312 of each diode pair 311 may be incident on a first optically transparent wall 319 along the flow channel 306. A first portion of light from the light paths 316 may pass through the first optically transparent wall 319 and into the flow channel 306, while a second portion of light from the light paths 316 may be reflected off of the first optically transparent wall 319 and may travel along a plurality of light paths 314 to the photodiode 310 of the diode pair 311, as illustrated in FIG. 3. The amount of light detected by the photodiode 310 is proportional to the amount of light being coupled into the flow channel 306. Although the light paths 316 and 314 are only illustrated with respect to one of the diode pairs 311, it should be understood that similar light paths are present for each of the plurality of diode pairs 311.

The integration of the light sources 312 along the bottom surface 315 of the flow cell 308 enables light emitted by each of the light sources to be incident directly on the first optically transparent wall 319. In one example, the bottom surface 315 of the flow cell including the light source 312 may be parallel to the first optically transparent wall 319. A distance d1 separating the bottom surface 315 and the first optically transparent wall 319 may enable the light emitted by the light source 312 integrated with the bottom surface 315 to travel directly to the first optically transparent wall without any optical conditioning. A length L1 of the first optically transparent wall may entirely overlap with a length L3 of the bottom surface, such that the light emitted from each of the light sources may be incident on the first optically transparent wall, and not on optically opaque wall sections 321 and 323 of the flow channel, which are adjacent to the first optically transparent wall 319 of the flow channel. The integration of the light sources within the flow cell may be such that the light path 316 and the light path 314 may not be obstructed by any structure present inside the flow cell. In one example, as shown in FIG. 3, no coupling optics may be present between the light source 312 and the first optically transparent wall 319.

Upon entering the flow channel 306 through the first optically transparent wall 319, the light may be at least partially absorbed by the liquid sample inside the flow channel 306. The absorption of light may depend on constituents present in the liquid sample in the flow channel, as further described above with respect to FIGS. 1 and 2. The unabsorbed light may exit the flow channel through a second optically transparent wall 318, opposite the first optically transparent wall 319. The second optically transparent wall 318 may be parallel to the first optically transparent wall 319 without being in face sharing contact with the first optically transparent wall 319. In one example, a length L2 of the second optically transparent wall 318 may be equal to the length L1 of the first optically transparent wall 319, and the second optically transparent wall 318 may be aligned with the first optically transparent wall 319 such that the second optically transparent wall 318 extends in parallel along an entire length of the first optically transparent wall 319.

Optically transparent glass, optically transparent plastic, fused quartz, etc., may form the first optically transparent wall and the second optically transparent wall. In one example, the transparency of the first optically transparent wall 319 and the second optically transparent wall 318 may exceed eighty percent. In an example, when the flow channel 306 is comprised of a capillary, the optical transparency of a first wall of the capillary receiving the light emitted by the LED and the optical transparency of a second wall, opposite the first wall, may be based on optical characteristics of the material used to make the first and the second wall of the capillary (for example, optically transparent glass, plastic, quartz, etc.). In another example, the flow channel 306 may instead be a cuvette, where in the liquid sample is loaded into the cuvette though an opening instead of flowing through the flow cell 308. In such an example, the first optically transparent wall 319 may be a first wall of the cuvette, and the second optically transparent wall 318 may be a second wall of the cuvette, opposite and parallel to the first wall.

Light may exit the second optically transparent wall 318 along a plurality of light paths 320 into a detection chamber 302, which may be configured to collect the light from the plurality of light paths 320. The detection chamber 302 is directly coupled to and integrated with the flow cell 308, such as by sharing the second optically transparent wall 318. For example, a bottom wall 330 of the detection chamber 302 may be at least partly the same as the second optically transparent wall 318 (e.g., the bottom wall 330 may be at least partly formed by the second optically transparent wall 318), which may at least partially define an upper surface of the flow cell 308. The light passing out from the flow channel 306 through the second optically transparent wall 318 may directly enter the detection chamber 302 along the plurality of light paths 320. The detection chamber 302 is coupled to the flow cell such that the light passing through the second optically transparent wall 318 leads directly to the detection chamber 302, without any structures/optical elements along the light paths 320 between the second optically transparent wall 318 and the detection chamber 302. The detection chamber 302 may be optically opaque and leak-proof, except at the second optically transparent wall 318, to enable all of the light along the light paths 320 to be captured in the detection chamber 302.

The detection chamber 302 includes one or more photodetectors coupled thereto. As shown, detection chamber 302 is coupled to a calibrated ultraviolet (UV) detector 305 and a calibrated visible light (VIS) detector 304. The UV detector 305 may be configured to measure light of a fixed wavelength or a range of wavelengths within the UV portion of the electromagnetic spectrum (e.g., between 190 nm and 300 nm). Similarly, the VIS detector 304 may be configured to measure light of a fixed wavelength or a range of wavelengths within the visible light portion of the electromagnetic spectrum (e.g., between 300 nm and 600 nm). Thus, both of the UV detector 305 and the VIS detector 304 serve as sample detectors, measuring light transmitted through the liquid sample within the flow channel 306. The light entering the detection chamber 302 (e.g., via the second optically transparent wall 318) may vary in its degree of dispersion depending on a density of the liquid sample in the flow channel 306, a relative amount of scattering and absorption through the liquid sample, and an effective refractive index of the liquid sample in the flow channel 306. Therefore, detection chamber 302 may include a small (e.g., 1-inch cubical or cylindrical) integrating chamber 303 to allow wider dispersion light exiting the flow cell 308 (e.g., via the flow chamber 306 and the second optically transparent wall 318) to be fully collected and measured by the UV detector 305 and/or the VIS detector 304. The integrating chamber 303 may include a diffuse, reflective coating along the interior of detection chamber 302 that creates a uniform scattering or diffusing effect, preserving an optical power of the reflected light. Thus, detection chamber 302 may also be referred to as an integrating detection chamber.

The light detected by each of the UV detector 305 and the VIS detector 304 in the detection chamber 302 is the light transmitted through the liquid sample inside the flow chamber 306 (e.g., not absorbed by the liquid sample). Absorbance (A) may be related to the transmittance (T) by the equation $A=-\log_{10}(T)$, which may be used by the controller 350 to convert a transmittance signal from one or both of the UV detector 305 and the VIS detector 304 into a sample absorbance measurement at a desired wavelength. The absorbance measurement may then be plotted as a function of time to generate a chromatogram representing the absorption profile of the liquid sample inside the flow cell. Furthermore, the absorbance measurement may be related to sample concentration by the Beer-Lambert law, $A=\varepsilon c l$, where A is the absorbance; $\varepsilon$ is a molar extinction coefficient (e.g., molar absorptivity), which is an intrinsic property of a chemical species; c is the concentration; and l is a pathlength of the sample. In the example of FIG. 3, the pathlength is the distance between the first optically transparent wall 319 and the second optically transparent wall 318.

FIG. 4 shows a second embodiment of an integrated illumination-detection flow cell 400, which may be used in a liquid chromatography system (e.g., HPLC system 100 of FIG. 1). The integrated illumination-detection flow cell 400 may share common features and/or configurations as those already described above with reference to FIG. 3. Components previously introduced in FIG. 3 are numbered similarly and not reintroduced.

The configuration of the flow channel 306 along the flow cell 308 in the integrated illumination-detection flow cell 400 is the same as described above with reference to FIG. 3, except for an optical element between each light source 312 and the first optically transparent wall 319 of the flow channel 306. The flow cell 308 includes the plurality of diode pairs 311 along the bottom surface 315, wherein each of the diode pairs includes the light source 312 and the reference diode 310. Light emitted from each light source 312, which may be an LED emitting light of specific wavelength, may travel toward the flow channel along a light path 416 to one of a plurality of coupling optics 430. Each of the coupling optics 430 may be positioned between each light source 312 and the first optically transparent wall 319 of the flow channel 306. Each of the coupling optics 430 directs (e.g., collimates or focuses) the light emitted by the corresponding light source 312 to the first optically transparent wall 319, as indicated by light paths 417, increasing an amount of light entering the detection chamber 302 via the flow channel 306. Some of the light emitted by each light source 312 may be reflected off the corresponding coupling optic 430 and may travel along light paths 414 to the photodiode 310 of the diode pair 311, as illustrated in FIG. 4.

Each of the coupling optics 430 may be a prism, a free-form optic, a Fresnel lens, a window, or a ball lens. The coupling optics 430 may minimize dispersion/scattering of the light emitted by the light source while travelling from the corresponding light source 312 to the first optically transparent wall 319. Due to the inclusion of the coupling optics 430, a distance d2 between the bottom surface 315 and the first optically transparent wall 319 may be greater than the distance d1 of the integrated illumination-detection flow cell 300 of FIG. 3.

The light through each coupling optic 430 in light paths 417 may be incident on the first optically transparent wall 319 along the flow channel 306. Upon entering the flow channel 306 through the first optically transparent wall 319, the light may be partly absorbed by the liquid sample flowing inside the flow channel 306. The unabsorbed light passes out of the flow channel 306 through the second optically transparent wall 318, opposite the first optically transparent wall 519, and into the integrating detection chamber 302, where it may be detected by UV detector 305 and/or VIS detector 304, as described above with reference to FIG. 3.

Thus, the embodiments of the integrated illumination-detection flow cell systems illustrated in FIGS. 3 and 4 both have the light source and the detection chamber integrated with the flow cell, such that the light path from the light source through the flow channel to the detection chamber passes through no optical elements (FIG. 3) or through very few optical elements (that is, one coupling optic 430 illustrated in FIG. 4). In contrast, a non-integrated light source, flow cell, and detector system, such as a traditional diode array detector system or a variable wavelength detector system, may include multiple optical elements between the light source and the detector (e.g., one or more mirrors, lenses, filters, slits, and beam splitters), leading to a longer optical path (and thus form factor of the liquid chromatography system) and noise generation. By integrating the light source, the flow cell, and the detector into a single unit, a smaller form factor of the detector unit, and thus the liquid chromatography system, is achieved. Furthermore, a signal-to-noise ratio at the UV and VIS detectors may be increased due to higher signal and spectral purity due to the short optical pathlength and fewer optical components. Additionally, traditional diode array detector systems and variable wavelength detector systems use deuterium or tungsten lamps as the light source, which have to be pre-warmed for at least 15-20 minutes before use and have a life span of approximately 2000 hours. In contrast, an LED light source, such as used in the integrated illumination-detection flow cell systems of FIGS. 3 and 4, does not need pre-warming, as the output of the LED is within ±2% of a nominal output at switch-on, and has an increased life span (e.g., >10,000 hours). As a result, the integrated illumination-detection flow cell system may be used without delay and may experience less maintenance than a traditional diode array detector system and variable wavelength detector system.

An example method 500 for operating a liquid chromatography detector system is illustrated in FIG. 5. In one example, the method 500 may be used to operate the integrated illumination-detection flow cell 300 or the integrated illumination-detection flow cell 400 illustrated in FIGS. 3 and 4, respectively. Instructions for carrying out the method 500 may be executed by a controller, such as the controller 350 of FIGS. 3 and 4, based on instructions stored on a memory of the controller and in conjunction with signals received by the controller from photodetectors of the detector system, such as the photodiode 310 and the UV detector 305 and/or the VIS detector 304 illustrated in FIGS. 3 and 4.

The method 500 begins at 502 by activating a light source emitting light of a desired wavelength. For example, the light source may be an LED or a laser diode, such as each light source 312 of FIGS. 3 and 4. The desired wavelength may be chosen based on an analyte of interest. For example, 254 nm may be chosen for detecting aromatic compounds. The controller may activate the light source by supplying voltage at a predetermined duty cycle to cause the light source to emit light of the desired wavelength at a desired output level (e.g., light intensity or optical power output). In one example, each light source of a plurality of light sources may be activated and controlled independently and may not be operated at the same time with the other light sources.

As light is emitted by the activated light source, the method 500 proceeds to 504. At 504, the method 500 includes adjusting the output level of the activated light source. The output level of the light source may be adjusted by the controller coupled to the light source based on the signal received by the controller from a reference detector, such as the photodiode adjacent to the activated light source, as indicated at 506. The output level of a given light source is linear with respect to the signal generated in the paired, adjacent reference photodiode. In one example, in an automatic power control (APC) mode, an analog loop may be used to maintain a constant output level of the light source based on the signal from the reference photodiode sent to the controller. An analog signal generated by the reference photodiode is relayed to the controller. Based on the analog signal received by the controller, the controller may modulate (e.g., increase or decrease) the light emitted by the light source to maintain a constant output of light incident on a liquid sample and/or a flow channel, such as on the first optically transparent wall 319 of the flow channel 306 illustrated in FIGS. 3 and 4.

Additionally, the output level of the light source may be adjusted based on absorption of the light by the liquid sample inside the flow channel and based on a minimum and a maximum threshold of the detector(s), as indicated at 508. The minimum threshold of each detector may correspond to a lower limit of detection, referring to a voltage output below which changes in light intensity cannot be distinguished from noise, and the maximum threshold of each detector may correspond to a saturation point, referring to a voltage output above which increases in light intensity do not increase (or, alternatively, do not linearly increase) the voltage output of the detector. In another example, the minimum threshold of each detector may be above the lower limit of detection and the maximum threshold of each detector may be below the saturation point such that the output level is maintained within a linear range of the detectors. The detectors may be coupled to an integrating detection chamber, such as detection chamber 302 of FIGS. 3 and 4. The output level of the light source may be adjusted to avoid saturating the UV and/or the VIS detectors, such as by decreasing the output level when the detector reaches its maximum threshold. Conversely, the output level of the light source may also be adjusted (e.g., increased) when the detector reaches its minimum threshold to avoid a weak signal and a poor signal-to-noise ratio. The controller may modulate the signal-to-noise ratio to an optimal range based on the UV or the VIS detector response level using a separate APC control loop. The output level of the selected light source may be adjusted such that the noise signal is minimized and the sample signal is maximized (thus generating an optimal signal-to-noise ratio).

In one example, when an amount of light absorbed by the liquid sample inside the flow cell is high, the light entering the detection chamber may be below the minimum threshold of the detectors. Hence, the output level of the activated light source may be increased to increase the light captured in the detection chamber. In another example, when the amount of light absorbed with the liquid sample is low, the light entering the detection chamber may be above the maximum threshold of the detectors, resulting in a saturated signal. Hence, the output level of the activated light source may be reduced to decrease the light captured in the detection chamber.

The method 500 proceeds to 510 and includes measuring the light transmitted through the liquid sample into the detection chamber via the detector(s). The light that is not absorbed by the liquid sample in the flow channel enters the detection chamber. The light inside the detection chamber may be detected by the UV detector and/or the VIS detector coupled to the detection chamber, as described above with reference to FIGS. 3 and 4.

At 512, the method 500 includes generating an absorbance spectrum of the liquid sample in the flow channel. For example, the controller may convert the light transmitted through the liquid sample, as detected at 510, to an absorbance value (e.g., according to $A=-\log_{10} T$), which may then be plotted against time (and/or fraction number) on a chromatogram. The absorbance spectrum may provide information about the constituent elemental makeup of the liquid sample passing through the flow cell. In one example, a first absorbance spectrum may be generated for the transmitted light detected by the UV detector, and a second absorbance spectrum may be generated for the transmitted light detected by the VIS detector. In some examples, both of the first and second absorbance spectra may be plotted on a single chromatogram. The method 500 then ends.

In this way, a plurality of light sources, such as LEDs, may be integrated within a wall of a flow cell of a liquid chromatography system to provide a desired wavelength light. At least a portion of the light emitted by each of the plurality of light sources may travel directly to a flow cell channel containing a sample without passing through multiple optical elements. At least a portion of the light that reaches the flow cell channel may be absorbed by the sample inside the flow cell, the extent of absorption depending on the constituents (e.g., components) of the liquid sample. The light not absorbed (e.g., transmitted) by the liquid sample in the flow cell may exit the flow cell to directly enter (without passing through optical elements) an integrated detection chamber, which may include one or more photodetectors coupled thereto and an integrating chamber.

The integration of the light source and the detection chamber with the flow cell reduces the use of optical elements, thereby reducing the form factor of the liquid chromatography system. In addition, the use of no or very few optical elements between the light source and the liquid sample and between the liquid sample and the detection chamber enhances the signal-to-noise ratio. Furthermore, the use of LEDs, which have a long lifespan and do not require pre-warming before use, may increase efficiency and reduce a cost of operating the liquid chromatography system.

An example provides for a liquid chromatography device. The device includes a flow cell with transmissive windows or capillary walls of a flow chamber. The transmissive windows or capillary walls are configured to house a liquid sample. The device further includes one or more LEDs or laser-diode (LD) sources integrated within the flow cell and one or more photodiodes adjacent to the LEDs for regulating source emission level. The flow cell is coupled to a detection chamber that includes a suitable detector (e.g., UV and/or VIS detector). The detection chamber may be partially formed by one of the transmissive windows or capillary walls of the flow chamber. Thus, the detection chamber may receive light that is emitted from the LED/LD and passes through the liquid sample. The detection chamber may be an integrating sphere or other suitable structure that is configured to equally direct light from virtually all angles to the detector. A housing/chassis supports the flow cell and detection chamber assembly.

The one or more LEDs or LD sources may each be configured to emit light of a specific wavelength. For example, a first LED may emit light at 254 nm, a second LED may emit light at 280 nm, a third LED may emit light at 395 nm, and a fourth LED may emit light at 525 nm. A power source may be provided (e.g., either internally or externally to the flow cell) to provide energy to activate the one or more LEDs or LD sources.

The device further includes a controller. The controller is configured to activate one or more of the one or more LEDs or LD sources. In one example, the controller is configured to couple a selected LED or LD to the power source to independently activate the selected LED or LD. For example, an input may be received for selecting a particular wavelength (e.g., 525 nm), and in response to receiving the input, the controller may couple the LED or LD configured to output that wavelength (e.g., the fourth LED) to the power source, thus activating that LED or LD.

The intensity of light output by the activated LED or LD may be controlled by an automatic power control (APC) circuit, in one example. The APC circuit may be a suitable feedback loop from the output of the photodiode to the input of the LED/LD that is configured to regulate the LED/LD light output as a function of the light detected by the adjacent photodiode, and may include suitable circuit elements, such as an input sampling resistor, an operating amplifier, a capacitor, a tuning transistor, and a transmitter optical sub-assembly.

In some examples, the controller may be configured to tune the signal-to-noise ratio (SNR) at the detection chamber by using the output from the detector as feedback to the LED/LD input. For example, the controller may obtain output from the detector, and if the output is above an upper threshold or below a lower threshold, the output intensity of the LED/LD may be adjusted.

By including a plurality of independently controllable discrete-wavelength light sources that include integrated photodiodes in the flow cell rather than relying on a single broad spectrum light source, expensive and/or bulky optical elements such as gratings, beam splitters, and the like may be dispensed with. As such, the LED/LD sources may be close-coupled to the transmissive window or capillary wall of the flow cell without any intervening optical elements. In this way, the device may have a relatively small form factor. However, in some examples, coupling optics (e.g., a Fresnel lens, a prism) may be provided between the LEDs or LDs and the transmissive window of the flow cell to increase an amount of light from the LEDs/LDs that is directed to the liquid sample in the flow cell and to the detector chamber.

While FIGS. 3 and 4 show examples of integrating light sources and detectors with a flow cell, other detector system configurations are also possible. In particular, detector systems that enable multiple wavelength illumination may provide added sample detection flexibility. FIG. 6 shows an example detector system 600 that may be included in a liquid chromatography system, such as HPLC system 100 of FIG. 1. The detector system 600 includes a light source 602 coupled to (e.g., mounted or bonded) a substrate 601, a first collimating lens (or optic) 604, and a second collimating lens (or optic) 605. The substrate 601 may include a suitable substrate, such as a chip on submount, TO can, C-mount, or butterfly mount. The first collimating lens 604 and the second collimating lens 605 are configured to direct light emitted by the light source 602 through a flow path 610 of a flow cell 611 to a signal detector 608. For example, if the detector system 600 is included in an HPLC system, liquid sample may flow through the flow cell 611 after eluting from an HPLC column (such as column 150 of FIG. 1) and before reaching a fraction collector (e.g., fraction collector 170 of FIG. 1). In the sample interrogation region of the flow path 610, the liquid sample may be exposed to the light emitted by the light source 602. As used herein, "flow path" refers to a region of the flow cell (e.g., defined by a portion of a capillary) configured to flow the liquid sample and also configured to receive and pass light. As shown, the signal detector 608 is positioned parallel to the light source 602 on the opposite side of the flow cell 611. Furthermore, a reference detector (e.g., photodiode) 606 is positioned perpendicular to the light source 602 on the same side of the flow cell 611.

The light source 602 may be a narrow bandwidth light source, such as a light-emitting diode (LED), organic LED (OLED), or a laser diode (LD). In one example, the light source 602 may be a single emitter that emits light of a single wavelength (or a single wavelength range, such as 620 to 640 nm for an LED that emits red light). In another example, the light emitted by the light source 602 may be of variable wavelength, such as a tunable laser diode. In still another example, the light source 602 may comprise a plurality of emitters, each emitter of the plurality of emitters emitting light of a single wavelength, such as an array of LEDs (e.g., "multi-color LEDs" or "RGB-LEDs"), or of variable wavelength, such as an array of laser diodes, as further described with respect to FIG. 12A-B. Further, the plurality of emitters may be packaged together or separately.

The light emitted by the light source 602 passes through the first collimating lens 604 and the second collimating lens 605 to enter the flow path 610 of the flow cell 611 along a light path 603. In one example, the light path 603 may be parallel to a direction of flow a sample inside the flow path 610 for a longitudinal flow cell. In another example, the light path 603 may be perpendicular to the direction of flow of the sample for a transverse flow cell. The longitudinal flow cell configuration allows for a longer pathlength (without increasing the flow cell volume or introducing cross-sectional area changes, which would result in peak broadening) than the transverse flow cell configuration, which enables more interactions to occur between the liquid sample within the flow path 610 and the light in the light path 603, increasing sample absorbance. At least a part of the light entering the flow cell 611 is absorbed by the sample inside the flow path 610. The unabsorbed light exits the flow cell and is detected by the signal detector 608, with an amount of light detected by the signal detector 608 varying based on both an intensity of the light emitted by light source 602 and absorbance characteristics of the sample inside the flow path 610. The amount of light detected by the signal detector 608 may be used to generate an absorbance spectrum of the sample, which may be used to determine constituents of the sample.

The reference detector 606 may control an output of the light source 602. In one example, the position of the reference detector 606 may be adjacent to the light source 602. In another example, the reference photodiode may be adjacent to the collimating lenses 604 and 605. A relative positioning of the reference detector 606 will be described below with respect to FIGS. 7-9. The output of the light source 602 may be regulated by the reference detector based on various factors, including light absorbed by the sample inside the flow cell, feedback from the signal detector 608, etc., as described above with reference to FIG. 5. The output of the light source 602 may be controlled via various control loop strategies, for example, analog circuitry, digital control algorithms such as proportional integrative derivative (PID), etc.

Figure 7:
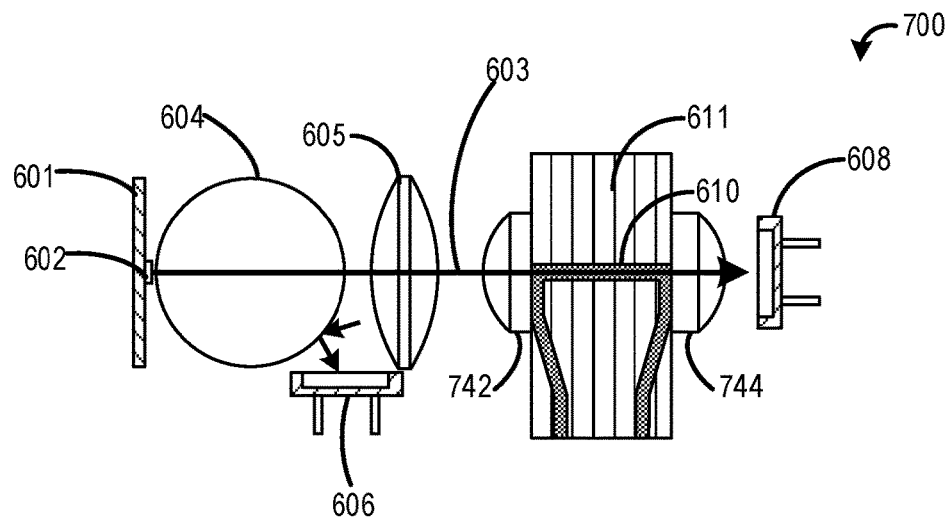
FIG. 7 shows schematic of a first configuration of optical components relative to the liquid chromatography flow cell.
Figure 8:
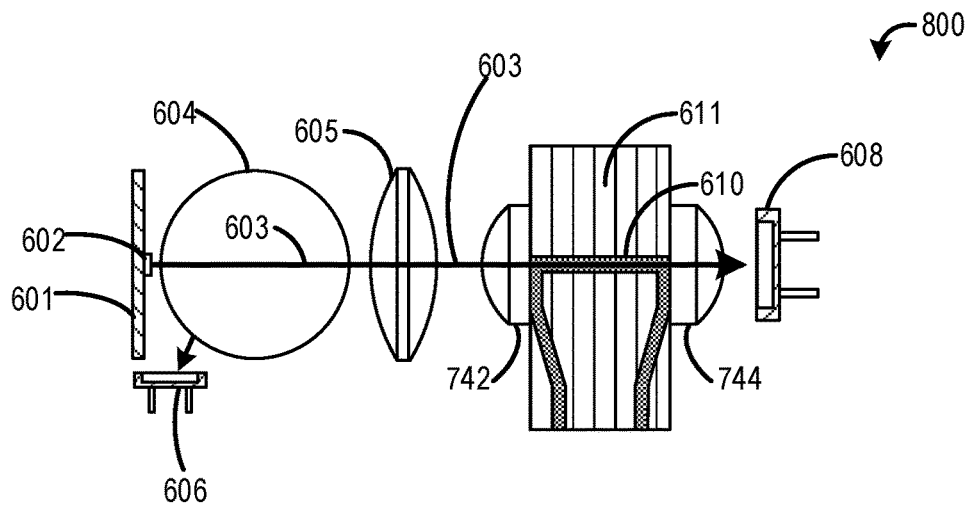
FIG. 8 shows schematic of a second configuration of optical components relative to the liquid chromatography flow cell.
Figure 9:
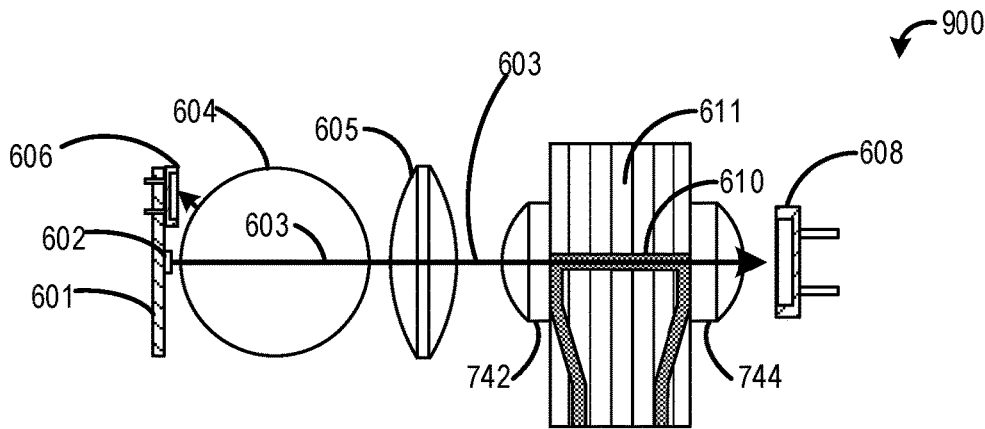
FIG. 9 shows a schematic of a third configuration of optical components relative to the liquid chromatography flow cell.

FIGS. 7-9 schematically illustrate a first configuration 700, a second configuration 800, and third configuration 900, respectively, of the relative positioning of optical elements within a detector system. The first configuration 700, the second configuration 800, and the third configuration 900 share common features with each other and with detector system 600 of FIG. 6, which are numbered similarly and may be not be reintroduced. For example, the first configuration 700, the second configuration 800, or the third configuration 900 may be included in the detector system 600 of FIG. 6. FIGS. 7-9 are described collectively.

Light is emitted from the light source 602 positioned on the substrate 601, passing through the first collimating lens 604 and the second collimating lens 605 as it travels along the light path 603. In other examples, additional optical elements may be present along the light path 603, including additional lenses (e.g., ball lens, collimating lens, Fresnel lens), collimators, light guides, and/or other optics. The light source 602, the first collimating lens 604, the second collimating lens 605, the flow path 610, and the signal detector 608 are all positioned along a common axis traversed by the light path 603. The light exiting the second collimating lens 605 enters the flow path 610 of the flow cell 611 via a first lens or window 742. As light in the light path 603 passes through the liquid sample within the flow path 610, at least a portion of the light is absorbed by the liquid sample. Transmitted (e.g., unabsorbed) light exits the flow cell 611 through a second lens or window 744 and is detected by the signal detector 608, which may be a variable-wavelength detector or a diode array, for example. The signal detector 608 may output a signal (e.g., in volts or amps) that is relative to an optical power or intensity (I) of light transmitted through the flow path 610 (and the liquid sample therein) along the light path 603. For example, as the intensity of light transmitted through the flow path 610 increases, the voltage output of the signal detector 608 increases. The signal output by the signal detector 608 may be received by a controller, which may store data from the signal detector 608 and perform various data processing actions, as described further herein (e.g., such as with respect to FIG. 5).

In some conditions, the light emitted by the light source 602 may fluctuate (e.g., in intensity and/or wavelength). For example, variations in the current supplied to the light source and/or variations in the temperature of the light source may result in changes to the intensity and/or wavelength output by the light source. Such fluctuations in the light source may result in erroneous sample absorbance measurements if not accounted for. Thus, detector systems generally include a separate reference detector (e.g., photodiode) that measures the light output from the light source that does not pass through the sample. In some examples, a beam splitter may redirect a portion of the light output by the light source to the reference detector. However, the beam splitter may add cost and complexity to the detector unit.

Thus, as shown in the example configurations of FIGS. 7-9, the reference detector 606 may be positioned to detect light in the detector system that has reflected or backscattered off of coupling optics or other structures in the detector system. In one example shown in FIG. 7, a portion of light may be reflected or backscattered by the second collimating lens 605 and the first collimating lens 604. The reference detector 606 is positioned off-axis from the common axis of the light source 602, the first collimating lens 604, the second collimating lens 605, the flow path 611, and the signal detector 608 and receives the portion of light that is backscattered or reflected. Thus, the portion of the light provides a reference signal. The reference detector 606 may operate similarly to the signal detector 608, outputting a voltage relative to an intensity of light detected. The control system may correlate fluctuations in light intensity measured by the reference detector 606 with fluctuations in light intensity measured by the signal detector 608 to generate a reference correction, for example.

In another example illustrated in FIG. 8, the reference detector 606 may be located between the light source 602 and the first collimating lens 603, off-axis from the common axis of the light source 602, the first collimating lens 604, the second collimating lens 605, the flow path 611, and the signal detector 608. As shown in FIG. 8, the reference detector 606 is positioned to receive a portion of the light emitted by the light source 602 that is reflected or backscattered by the first collimating lens 604. In a further example illustrated in FIG. 9, the reference detector 606 may be present adjacent to the light source 602, coupled to the substrate 601, allowing for more efficient packaging and miniaturization. Similar to the first configuration 700 of FIG. 7 and the second configuration 800 of FIG. 8, the reference detector 606 is positioned off-axis from the common axis of the light source 602, the first collimating lens 604, the second collimating lens 605, the flow path 611, and the signal detector 608 and is configured to receive light reflected or backscattered by the first collimating lens 604.

As described above with reference to FIGS. 5 and 6, the reference detector 606 and/or the signal detector 608 may control an output of the light source 602. In one example, the output of the light source 602 may be regulated to maintain a constant response level at the signal detector 608. As absorption of light passing through the sample inside the flow cell increases (for example, due to molecular composition/concentration of the sample), the output of the light source also increases to maintain constant signal at the signal detector 608. In one example, a continuous mode of output change may occur, where the output of the light source changes smoothly. In another example, a range selector mode of maintaining the output may be used, where light output is changed from a first range/mode to a second range/mode. This allows the signal detector 608 to operate in a more linear range of responsivity curve and allows the system to obtain a wider dynamic range, especially when analyzing high concentration samples.

In the embodiments shown in FIGS. 6-9, light passes through the flow cell longitudinally to maximize the pathlength and the associated sample absorbance, as per the Beer-Lambert relationship. In an alternative example, the light passing through the flow cell may utilize a total internal reflectance off walls of the flow cell to increase an effective pathlength of photons in the light interacting with molecules of the sample inside the flow cell. In flow cells formed by materials such as machined blocks of metal, polymers, ceramics, quartz, glass, etc., or in lab-on-chip applications where the flow cell is formed by transparent plates bonded together, the reflectance off of walls of the flow cell may increase the effective pathlength of the light interacting with the sample inside the flow cell.

Figure 10:
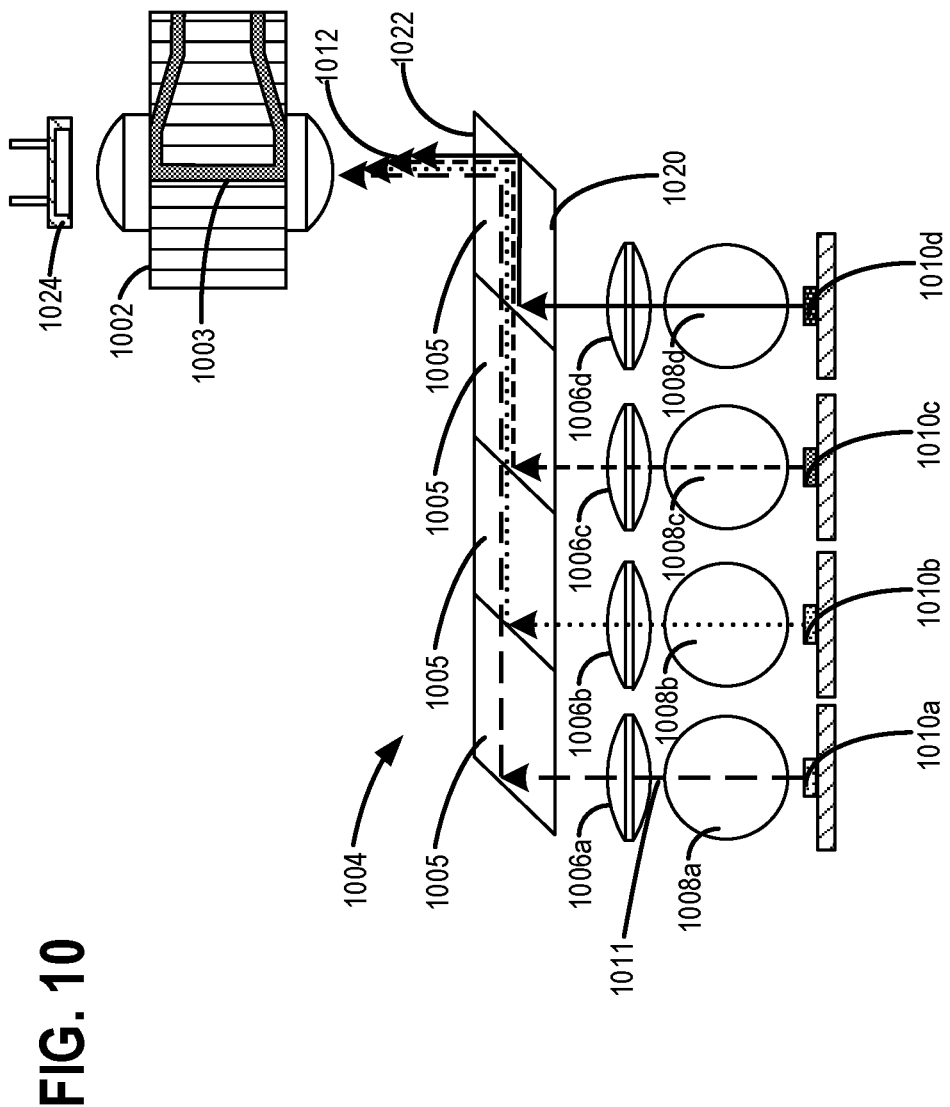
FIG. 10 shows schematic of a dichroic beam combining system that may be included in a liquid chromatography detector system.

FIG. 10 discloses an embodiment of a dichroic beam combining system 1000, which may be included in a liquid chromatography system (e.g., HPLC system 100 of FIG. 1). The dichroic beam combining system 1000 includes a flow cell 1002 with light sources 1010a, 1010b, 1010c, and 1010d, where each of the light sources may emit a light of different wavelength. In another example, the light sources may each emit light of the same wavelength. In some examples, more than four or less than four light sources may be present. The dichroic beam combining system 1000 uses dichroic beam combining via right angle prisms, mirrors, or rhomboid plates, which each allow a higher wavelength light to pass through and reflect a lower wavelength light. For example, the light sources 1010a, 1010b, 1010c, and 1010d may be included in a linear array of LED or LD light sources arranged in decreasing wavelength order such that the light source 1010a as the longest wavelength (e.g., red light) and the light source 1010d has the shortest wavelength (e.g., UV light).

Light emitted from each of the light sources passes through a corresponding first collimating lens 1008a, 1008b, 1008c, and 1008d at each light source position and enters a corresponding second collimating lens 1006a, 1006b, 1006c, and 1006d along a light path 1011. The light emitted by each light source is represented by a different line type (e.g., large dash for the light source 1010a, dotted for the light source 1010b, short dash for the light source 1010c, and solid for the light source 1010d). The number of first and second collimating lenses may each be equal to the number of light sources. The first and the second collimating lenses reduce the angular spread of light emitted from the corresponding light source.

The light exiting each of the second collimating lenses enters a dichroic combining block 1004. The dichroic combining block 1004 includes a plurality of plates 1005. In one example, the plates 1005 may be optically transparent with sufficient surface figure (e.g., less than $\frac{1}{20}^{th}$ of the wavelength of light emitted by the corresponding light source). Each plate 1005 may be physically and optically in contact with adjacent plates and may be made of material with high refractive index, such as sapphire, fused quartz, etc. In one example, the plates 1005 may be held together by Van der Waals forces and without adhesives. In another example, an adhesive or other interface material with suitable optical transmission properties at the wavelengths of interest may be used (for example, adhesives such as NOA88, fluoropolymers such as CYTOP). In still other examples, air spaces may be present between the plates. The plates 1005 may be arranged in a parallel configuration relative to each other (e.g., with less than 1 arcsecond angular difference).

The light exiting each of the second collimating lenses may enter the dichroic combining block 1004 through an entrance surface 1020 of each of the plates 1005. The light from the light channel may collectively exit the dichroic combining block 1004 though an exit surface 1022 along a light path 1012 and enter a flow path 1003 of a flow cell 1002. In this way, the light emitted separately by each light source is combined into a single beam. Additional focusing optics may be placed between the exit surface 1022 and the flow cell 1002. Furthermore, an additional surface may be provided to fold the light in the dichroic combining block 1004 based on a relative arrangement of the flow cell 1002, such as due to packaging constraints. As shown in FIG. 10, a signal detector 1024 is positioned on an opposite side of the flow cell 1002 from the dichroic combining block 1004 and on a common axis with the flow path 1003 and the light path 1012.

The plates 1005 may include dichroic coating(s) to redirect the light beams entering the light channel to be collinear. Additional dichroic coatings may be added to the entrance surface and the exit surface of the light channel to decrease reflective loss of light.

Each of the optical elements illustrated in FIG. 10 may be positioned and secured on a structural chassis, for example, by adhesives and/or by mechanical means. The example of FIG. 10 shows four plates 1005 for four lights sources 1010a, 1010b, 1010c, and 1010d, but in other examples, two or more plates 1005 may be included to combine light emitted by three light sources.

In another embodiment, multiple dichroic combining blocks may be arranged in parallel. For example, a first set of four light sources may feed a first dichroic combining block, and a second set of four light sources may feed a second dichroic combining block. The light combined by the first dichroic combining block and the light combined by the second dichroic combining block may be directed to a third dichroic combining block to achieve a combined eight wavelengths of light, which may then be directed to a flow cell. Such a configuration allows for selection of simplified optical filters to combine sources with peak wavelengths that are close to each other (e.g., within a small wavelength difference).

Dichroic combining enables efficient and collinear combining of multiple wavelengths of light, resulting in a smaller form factor, which is ideal for portable systems. The dichroic combining may provide two to eight wavelength of light without changing chassis size. The configuration for dichroic combining described above provides a fixed alignment, which is stable against vibration and shock loads.

Figure 11:
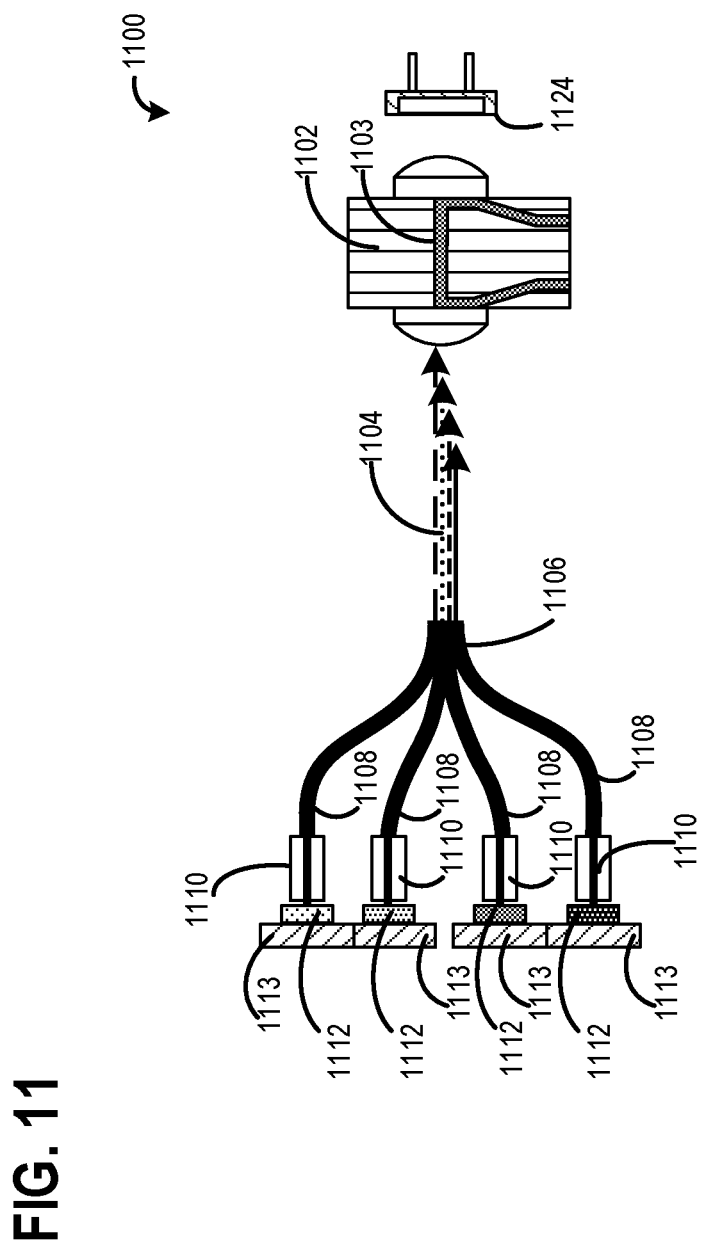
FIG. 11 shows schematic of a fiber-coupled beam combining system that may be included in a liquid chromatography detector system.

FIG. 11 shows a fiber-coupled beam combining system 1100, which may be included in a liquid chromatography system (e.g., HPLC system 100 of FIG. 1). The fiber-coupled beam combining system 1100 uses optical fibers to achieve coaxial beam combining. Each of a plurality of light sources 1112 is positioned on a corresponding substrate 1113. In one example, each light source 1112 may emit a light of a different wavelength. In another example, each light source may emit a light of a same wavelength. In one example, each of the plurality of light sources 1112 may be an LED or an LD light source. As an example, when each of the plurality of light sources 1112 emits light of the same wavelength, the plurality of light sources 1112 may be lower wavelength LEDs (e.g., 255 nm or 230 nm), which emit lower power light than higher wavelength LEDs.

In one example, each of the light sources 1112 may be coupled to a corresponding, separate substrate 1113 while in another example, the plurality of light sources 1112 may be coupled to a common substrate. In another example, two or more light sources may be coupled to each substrate 1113. In further embodiments, the substrate and the light sources may be present in a different ratio. The substrates 1113 may be made of low-cost materials, for example, metal core circuit boards, allowing for reduced costs and greater flexibility in configurations of the substrates. Each of the light source and substrates may be spaced as needed for optimal thermal dissipation and/or to meet packaging constraints.

Each of the light sources 1112 may be coupled to a corresponding optical fiber 1108 at a joining node 1110. The coupling at the joining node 1110 may be a mechanical coupling, through an adhesive, or through a fused-fiber combiner. Each of the optical fibers 1108 may join at a common node 1106. A coaxial beam 1104 emitted from the common node 1106 is delivered to a flow path 1103 of a flow cell 1102. The optical fibers 1108 may be spaced for a compact optical path to the flow cell, for example. As shown in FIG. 11, a signal detector 1124 is positioned on an opposite side of the flow cell 1102 from the common node 1106 and on a common axis with the flow path 1103 and the coaxial beam 1104.

FIG. 12A shows a waveguide beam combining system 1200 with a waveguide 1206 for combining light beams and directing the combined light beam to a flow cell 1202. The waveguide beam combining system 1200 includes a substrate 1209 with an arrangement of light sources 1208. In one example, the arrangement of light sources 1208 coupled to the substrate 1209 may include four light sources (e.g., LEDs or LDs) placed in a two by two array, as illustrated in FIG. 12B. Each of the light sources in the arrangement of light sources 1208 may emit light of a different wavelength. In other examples, the number and the arrangement of light sources on the substrate 1209 may vary.

The arrangement of light sources 1208 is positioned at an entrance 1205 of the waveguide 1206, as illustrated in FIG. 12A. Light emitted from the arrangement of light sources 1208 travels along the waveguide 1206 and exits the waveguide at an exit 1207 to enter a collimating optic 1204 along a light path 1211. In one example, more than one collimating optic may be present between the waveguide 1206 and the flow cell 1202. The light exiting the collimating optics 1204 enters a flow path 1203 of the flow cell 1202 and travels along a longitudinal length of the flow path 1203 containing a sample. The light exiting the flow path 1203 of the flow cell 1202 is detected by a signal detector 1210.

The waveguide 1206 may be hollow and cylindrical, triangular, square, hexagonal, or any other shape to allow the light beam to enter through the entrance and travel through the waveguide to the exit. In one example, the waveguide 1206 may include reflective inner walls and may be filled with a suitable gas or may have a vacuum to enable optimal light mixing. In one example, the inner walls of waveguide 1206 may comprise aluminum surface mirrors.

The waveguide beam combining system 1200 delivers a very homogenous light to the flow cell 1202 after mixing inside the waveguide 1206. The light entering the waveguide includes light of various wavelengths emitted from each of the light sources in the arrangement of light sources 1208. As the light travels along the waveguide 1206, the light of the various wavelengths mixes such that the light exiting the waveguide has a uniform mixture of light of the various wavelengths. The use of commercially available components and simple alignments of the components of the waveguide beam combining system 1100 allows for low cost manufacturing.

Figure 13:
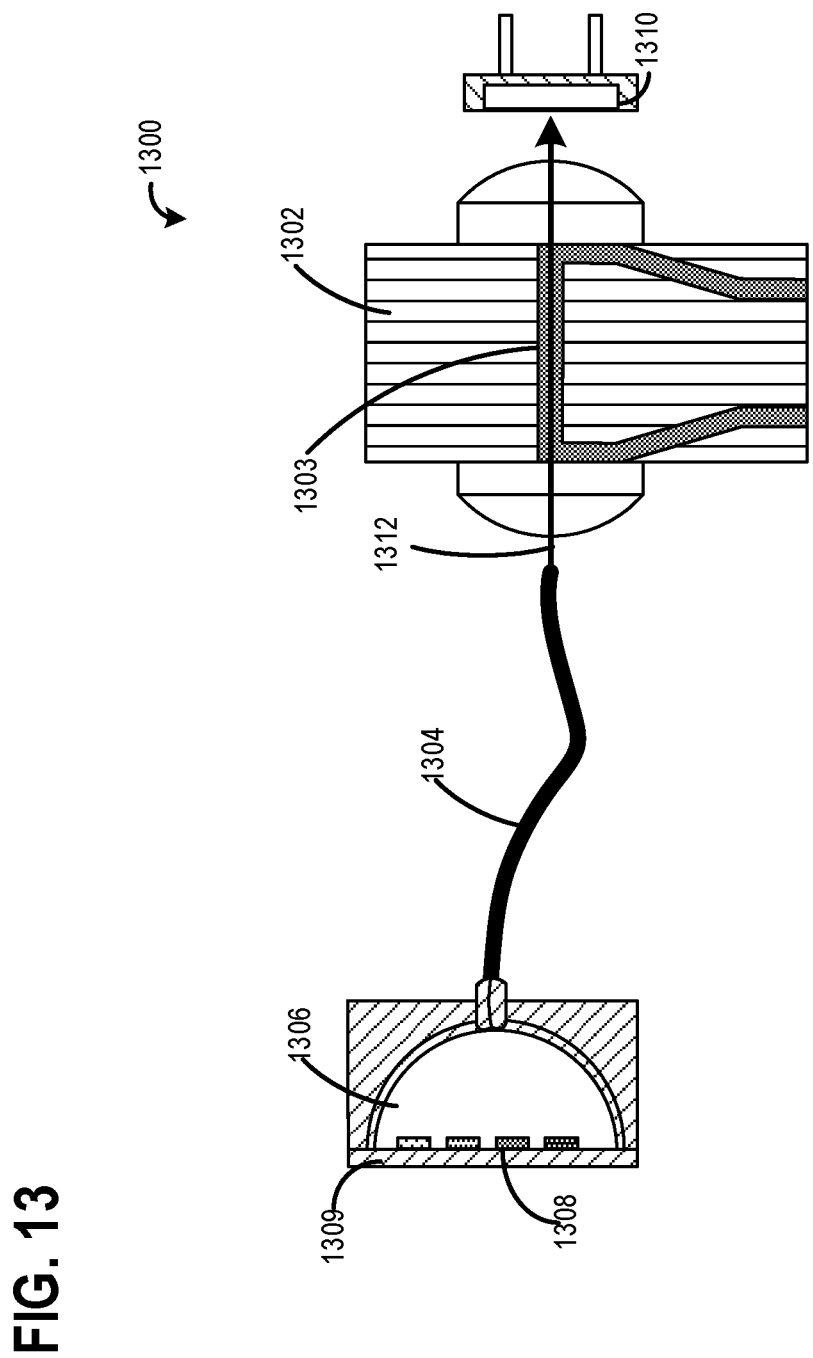
FIG. 13 shows schematic of an integrating chamber beam combining system that may be included in a liquid chromatography detector system.

FIG. 13 shows an integrating chamber beam combining system 1300 that includes an integrating chamber 1306 for combining a multiple wavelengths of light into a single light beam before the light beam is passed through a flow path 1303 of a flow cell 1302.

Each light source of an arrangement of light sources 1308 coupled to a substrate 1309 emits light, which enters the integrating chamber 1306. In one example, the arrangement of light sources 1308 coupled to the substrate 1309 may include four light sources (e.g., LEDs or LDs) placed in a two by two array, such as the arrangement of light sources 1208 as illustrated in FIG. 12B. Each of the light sources in the arrangement of light sources 1308 may emit light of a different wavelength. In other examples, the number and the arrangement of light sources on the substrate 1309 may vary. In one example, the light sources 1308 may be positioned along a perimeter of the integrating chamber 1306.

Inner surfaces of the integrating chamber 1306 may be made of a reflective material with high reflectivity over a desired wavelength range. In one example, when a large wavelength range is desired, a diffusely reflective material that can reflect light ranging from 200 nm into to the visible light range may be used, such as polytetrafluoroethylene (PTFE). In another example, a specularly reflective surface may be used, such as uncoated aluminum may be used inside the integrating chamber 1306. The integrating chamber 1306 may be a hemisphere, similar to half of an integrating sphere. Other geometries for the integrating chamber 1306 may also be suitable.

The light that exits the integrating chamber is of homogeneous wavelength due to mixing within the integrating chamber 1306. The light travels along an optical fiber 1304 and is directed along light path 1312 to enter the flow path 1303 of the flow cell 1302. In one example, more than one optical fiber may carry the light from the integrating chamber towards the flow cell. The light exiting the flow cell 1302 is detected by a signal detector 1310. In one example, one or more collimating optics may be present between the integrating chamber 1306 and the flow cell 1302 to direct light to the flow path 1303 of the flow cell 1302.

Figure 14:
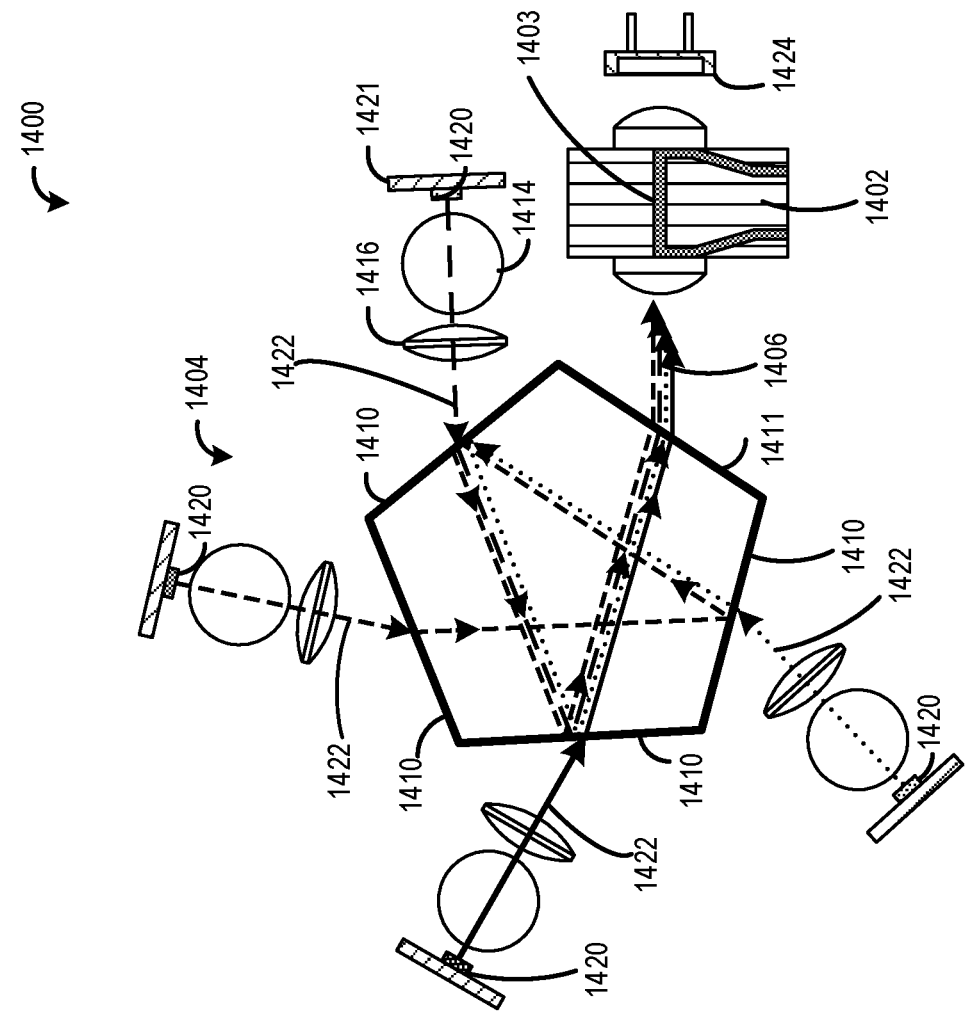
FIG. 14 shows schematic of a polygonal prism beam combining system that may be included in a liquid chromatography detector system.

A polygonal prism beam combining system 1400 with a prism beam combiner 1404 that combines light emitted from a plurality of light sources 1420 is illustrated in FIG. 14. The prism beam combiner 1404 may be a monolithic transparent polygon with a flat input surface 1410 for each corresponding light source 1420 and one flat output surface 1411 for directing a mixed light beam 1406 to a flow path 1403 of a flow cell 1402. In one example, the prism beam combiner may be made of reflective optical plates with dichroic coating.

In one example, the prism beam combiner 1404 may be a pentagon with five flat surfaces, of which four flat input surfaces may receive light emitted from the corresponding light source while a fifth flat output surface of the prism beam combiner faces the flow cell 1402 to direct the mixed light beam 1406 from the prism beam combiner 1404 to the flow path 1403. In another example, the prism beam combiner 1404 may have six flat surfaces, where five of the six flat surfaces receive light from the corresponding light sources and the mixed light beam 1406 is directed through a sixth flat surface to the flow path 1403. As such, any number of sides may be chosen for the polygon such that a total number of sides is one greater than a number of light sources.

Each light source 1420 is coupled to a substrate 1421. The light emitted by each of the light sources 1420 travels along a corresponding light path 1422 through a corresponding first collimating lens 1414 and a corresponding second collimating lens 1416 and is incident on a corresponding flat input surface 1410 of the prism beam combiner 1404. The light emitted by each of the light sources 1420 is illustrated by different line types (e.g., solid, short dash, long dash, and dotted). The light from each of the light sources 1420 mixes inside the prism beam combiner 1404 and exits the flat output surface 1411 as the mixed light beam 1406 to enter the flow path 1403, where it may be at least partially absorbed by a liquid sample inside of the flow path before being transmitted to a signal detector 1424. The prism beam combiner 1404 along with light sources 1420 and the flow cell 1402 may all be positioned along a mechanical chassis, which may enable fixed alignment that is stable against vibration and shock. The prism beam combiner enables combining of multiple wavelengths of light without increasing a size of the prism.

Figure 15:
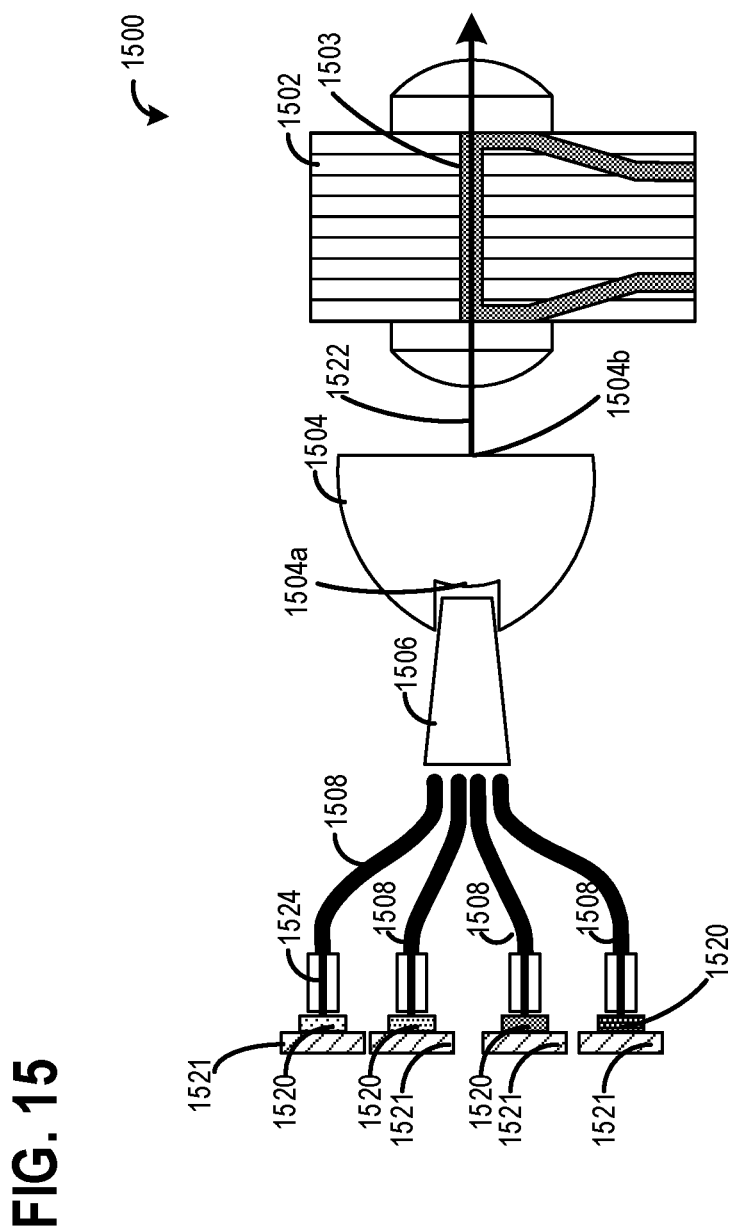
FIG. 15 shows schematic of a compound beam combining system that may be included in a liquid chromatography detector system.

FIG. 15 shows a compound beam combining system 1500, including a plurality of optical fibers 1508 coupled to an integrating rod 1506. The integrating rod 1506 is coupled to a total internal reflection (TIR) optic 1504. A plurality of light sources 1520, each coupled to a respective substrate 1521, emit light. Each of the light sources 1520 may be LEDs emitting light of a same wavelength in one example. In another example, each of the LEDs may emit light of a different wavelength. Each of the light sources 1520 coupled to the corresponding substrate 1521 may be spatially separated from each other to lower heat flux density and for efficient thermal management.

The light emitted from each of the light sources 1520 is directed through a corresponding optical fiber 1508 coupled to the light source at a joint 1524. In one example, an adhesive may couple (e.g., bond) the corresponding optical fiber 1508 to the each of the light sources 1520. In another example, the coupling may be mechanical (e.g., a butt joint). Each of the optical fibers 1508 may be a large core, large numerical aperture multimode optical fiber, for example.

The light travelling through each of the optical fibers 1508 enters the integrating rod 1506, which results in mixing of the light inside the integrating rod 1506. In one example, the integrating rod 1506 may be made of fused silica. In another example, a reflective-walled integrating rod or integrating chamber may be used to mix the beam of light received through the optical fibers 1508. In one example, walls of the integrating rod may be made of UV-transmittance aluminum coated surface mirrors.

The TIR optic 1504 images light exiting the integrating rod 1506. The TIR optic includes a first elliptical focal point 1504a that is positioned at a center of an exit plane of the integrating rod 1506 on an outer surface of the TIR optic 1504. The first elliptical focal point 1504a images (e.g., directs) the high angle/high numerical aperture rays to a second elliptical focal point 1504b positioned at an optical inlet of the flow cell 1502, effectively reducing the angle of the high numerical aperture rays. A third optical surface of the TIR optic, located internally, may be substantially planar and images low-angle rays exiting the integrating rod 1506. The light exiting the TIR optic enters a flow path 1503 of a flow cell 1502 along a light path 1522 along a longitudinal length of the flow cell.

In one example, the TIR optic may be a diamond-turned crystalline. In another example, the TIR optic may be a molded material such as calcium fluoride or magnesium fluoride, fused quartz, a high-UV transmission silicone, or a fluoropolymer.

In another example, a reflecting optic and a separate lens may be used in place of the TIR optic 1504. In another example, a fused fiber combiner may be used in place of the optical fibers 1508 and the integrating rod 1506.

Figure 16:
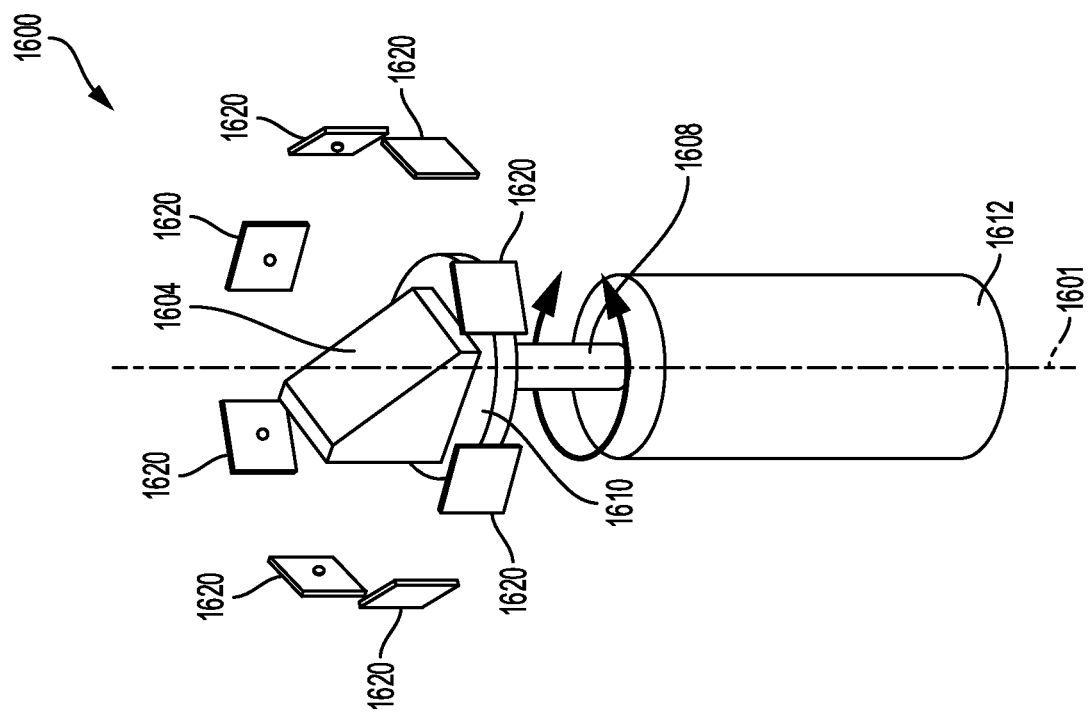
FIG. 16 shows schematic of a multiplexing light source selection system that may be included in a liquid chromatography detector system.

FIG. 16 illustrates a multiplexing system 1600 for directing light to travel through a flow cell (not shown). The multiplexing system 1600 includes a reflective surface 1604 that rotates along an axis 1601. In one example, the reflective surface may be a mirror. In another example, the reflective surface 1604 may be a reflective prism. In a further example, the reflective surface 1604 may be of a two-axis gimballed mirror.

The reflective surface 1604 may be positioned on a stage 1610 that may be rotated along the axis 1601. The stage 1610 may be coupled through an axle 1608 to a motor 1612. The motor 1612 may be operated to rotate the stage and hence, the reflective surface 1604 at a desired rotation speed in a clockwise and/or a counterclockwise direction. In one example, the reflective surface 1604 may be rotated at a constant speed. In another example, the reflective surface 1604 may be indexed from one position to a next position. The motor 1612 may be a galvanometer, a limited angle motor, or other suitable motor. Noise generated due to rotation by the motor may be reduced via a lock-in amplifier (not shown) coupled to the multiplexing system 1600. In another example, a micro machined Micro Optical Electrical Mechanical Systems (MOEMS) mirror may be used in place of the reflective surface 1604 and the motor 1612.

A plurality of light sources 1620 are placed radially around a perimeter of the stage 1610. The light sources 1620 may be LED or LD light sources, where each light source may emit light of a different wavelength. A number light sources in the plurality of light sources 1620 may vary. For example, eight light sources 1620 are illustrated in FIG. 16. In other examples, the number of light sources may be less than or more than eight. In one example, each of the light source may be spaced and angled similarly relative to the reflective surface 1604. In another example, the light sources 1620 may be placed at staggered distances and differing angles relative to the reflective surface 1604 to meet packaging constraints. Each of the light sources may be individually selected to emit light of a desired wavelength.

Based on the rotation of the stage with the reflective surface 1604 and alignment of a selected light source 1620 with the reflective surface 1604, light emitted by the selected light source 1620 may be incident on the reflective surface 1604. Light reflected from the reflective surface may then be directed to a flow cell with a sample (not shown). One or more collimating optics may be present between each of the light sources 1620 and the reflective surface 1604 and between the reflective surface 1604 and the flow cell (not shown). In an alternative example, the reflective surface 1604 may be stationary while the light sources 1620 may be rotatable such that light emitted from the selected light source 1620 is incident on the reflective surface 1604. The multiplexing system 1600 may enable temporal switching of the selected light source 1620 depending on characteristics of the sample inside the flow cell.

In this way, various configurations of optical elements described above with reference to FIGS. 6-16 may be used in a liquid chromatography flow cell for increasing packaging efficiency, for dissipating excess heat, for homogenous mixing of light from multiple light sources, and for stable and cost-effective alignment of optical elements for accurate sample analysis.

As one example, a detector system comprises: a flow cell including an optically transparent first wall and an optically transparent second wall, the optically transparent second wall positioned opposite the optically transparent first wall; a plurality of light sources integrated within the flow cell, the plurality of light sources configured to emit light to travel through the optically transparent first wall into the flow cell; and a detection chamber integrated with the flow cell and configured to capture light passing out from the flow cell through the optically transparent second wall into the detection chamber. In the preceding example, additionally or optionally, an interior of the detection chamber includes a diffuse, reflective coating that uniformly scatters the captured light. In any or all of the preceding examples, additionally or optionally, each of the plurality of light sources is adjacent to a reference photodiode integrated within the flow cell, the reference photodiode configured to detect light emitted by the adjacent light source. In any or all of the preceding examples, the detector system additionally or optionally further comprises a photodetector coupled to the detection chamber. In any or all of the preceding examples, additionally or optionally, the photodetector is configured to detect ultraviolet and/or visible light. In any or all of the preceding examples, the detector system additionally or optionally further comprises a coupling optic between each of the plurality of light sources and the first transparent wall of the flow cell. In any or all of the preceding examples, additionally or optionally, no coupling optics are included in the detector system. In any or all of the preceding examples, additionally or optionally, the detector system is included in a high-performance liquid chromatography system. In any or all of the preceding examples, the detector system additionally or optionally further comprises a controller storing executable instructions in non-transitory memory that, when executed, cause the controller to: activate a light source of the plurality of light sources to emit light of a desired wavelength; and control an output level of the activated light source based on input received from the reference photodiode adjacent to the light source.

As another example, a method comprises: activating one light emitting diode (LED) from a plurality of LEDs integrated within a flow cell; adjusting an output of the one LED based on a signal from a reference photodiode adjacent to the one LED, the output of the one LED passing through a first optically transparent wall of the flow cell into a sample chamber of the flow cell; and detecting an amount of light transmitted through the sample chamber through a second optically transparent wall of the flow cell, opposite the first optically transparent wall, via one or more photodetectors coupled to a detection chamber integrated with the flow cell. In the preceding example, additionally or optionally, each of the plurality of LEDs emits light of a different wavelength. In any or all of the preceding examples, additionally or optionally, the detection chamber is an integrating chamber, and a bottom surface of the detection chamber is at least partially comprised of the second optically transparent wall. In any or all of the preceding examples, the method additionally or optionally further comprises determining an absorbance of a sample within the sample chamber based on the detected amount of light transmitted through the sample chamber. In any or all of the preceding examples, additionally or optionally, adjusting the output of the one LED based on the signal from the reference photodiode adjacent to the one LED includes modulating the output of the one LED so that an amount of light measured by the reference photodiode remains constant. In any or all of the preceding examples, the method additionally or optionally further comprises adjusting the output level of the one LED based on a signal measured by the one or more photodetectors based on a signal-to-noise ratio.

As another example, a multiple wavelength illumination system comprises: a flow cell configured to receive light emitted from a plurality of light sources; at least one light combining device to mix the light emitted by the plurality of light sources before the light is received by the flow cell; at least one collimating optic to direct light from the at least one light combining device to the flow cell; and a detector to detect light exiting the flow cell. In the preceding example, additionally or optionally, wherein the at least one light combining device includes a fiber optic cable. In any or all of the preceding examples, additionally or optionally, the at least one light combining device includes a waveguide. In any or all of the preceding examples, additionally or optionally, the at least one light combining device has a dichroic coating. In any or all of the preceding examples, additionally or optionally, the at least one light combining device includes a polygonal prism.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

FIGS. 1-4 and FIGS. 6-16 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred to as such, in one example.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A detector system, comprising:
a flow cell including an optically transparent first wall and an optically transparent second wall, the optically transparent second wall positioned opposite the optically transparent first wall;
a plurality of light sources integrated within the flow cell and positioned on a bottom surface within the flow cell, the plurality of light sources configured to emit light to travel through the optically transparent first wall into the flow cell;
a plurality of coupling optics between the plurality of light sources and the optically transparent first wall;
a plurality of reference photodiodes integrated within the flow cell and positioned on the bottom surface within the flow cell, each of the plurality of reference photodiodes is adjacent to a respective one of the plurality of light sources, each of the plurality of reference photodiodes is configured to detect a portion of light emitted by the adjacent light source and reflected from a respective one of the plurality of coupling optics; and
a detection chamber integrated with the flow cell and configured to capture light passing out from the flow cell through the optically transparent second wall into the detection chamber.

2. The detector system of claim 1, wherein an interior of the detection chamber includes a diffuse, reflective coating that uniformly scatters the captured light.

3. The detector system of claim 1, further comprising a photodetector coupled to the detection chamber, wherein the photodetector is configured to detect ultraviolet and/or visible light.

4. The detector system of claim 1, wherein each of the plurality of coupling optics is between a respective one of the plurality of light sources and the first transparent wall of the flow cell.

5. The detector system of claim 1, wherein no coupling optics are included in the detector system.

6. The detector system of claim 1, wherein the detector system is included in a high-performance liquid chromatography system, and wherein light from each of plurality of light sources travel directly to the first transparent wall of the flow cell.

7. The detector system of claim 1, further comprising a controller storing executable instructions in non-transitory memory that, when executed, cause the controller to:
activate a light source of the plurality of light sources to emit light of a desired wavelength; and
control an output level of the activated light source based on input received from the reference photodiode adjacent to the light source.

8. The detector system of claim 1, wherein respective outputs of the plurality of light sources are to travel along respective light paths to respective ones of the plurality of coupling optics.

9. The detector system of claim 1, wherein the detection chamber comprises a first detector and a second detector.

10. The detector system of claim 9, wherein the first detector is configured to detect a first range of wavelengths and the second detector is configured to detect a second range of wavelengths, the second range of wavelengths different from the first range of wavelengths.

11. The detector system of claim 9, wherein the first detector and the second detector are exposed to a first range of wavelengths including a second range of wavelengths and a third range of wavelengths, the second range of wavelengths different from the third range of wavelengths, the first detector is configured to detect the second range of wavelengths, and the second detector is configured to detect the third range of wavelengths.

12. A multiple wavelength illumination system, comprising:
a flow cell configured to receive light emitted from a plurality of light sources positioned on a bottom surface within the flow cell;
at least one light combining device to mix the light emitted by the plurality of light sources before the light is received by the flow cell;

at least one collimating optic to direct light from the at least one light combining device to the flow cell;

a plurality of reference photodiodes positioned on the bottom surface within the flow cell, each of the plurality of reference photodiodes is adjacent to a respective one of the plurality of light sources, each of the plurality of reference photodiodes is configured to detect light emitted by the adjacent light source and reflected from a respective one of the at least one collimating optic; and a detector to detect light exiting the flow cell.

13. The multiple wavelength illumination system of claim 12, wherein the at least one light combining device includes a fiber optic cable.

14. The multiple wavelength illumination system of claim 12, wherein the at least one light combining device includes a waveguide.

15. The multiple wavelength illumination system of claim 12, wherein the at least one light combining device has a dichroic coating.

16. The multiple wavelength illumination system of claim 12, wherein the at least one light combining device includes a polygonal prism.

\* \* \* \* \*